(12) United States Patent
Koike

(10) Patent No.: US 7,531,735 B2
(45) Date of Patent: May 12, 2009

(54) MUSICAL PIECE EXTRACTION PROGRAM, APPARATUS, AND METHOD

(75) Inventor: Takashi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/134,502

(22) Filed: Jun. 6, 2008

(65) Prior Publication Data

US 2008/0236367 A1 Oct. 2, 2008

Related U.S. Application Data

(63) Continuation of application No. 11/670,529, filed on Feb. 2, 2007, now Pat. No. 7,453,038.

(30) Foreign Application Priority Data

Feb. 16, 2006 (JP) ............................. 2006-039985

(51) Int. Cl.
*G04B 13/00* (2006.01)
*G10H 7/00* (2006.01)
(52) U.S. Cl. .............................. 84/609; 84/601; 84/615
(58) Field of Classification Search ...................... None
See application file for complete search history.

(56) References Cited

U.S. PATENT DOCUMENTS

| 5,712,953 | A | 1/1998 | Langs |
| 6,941,275 | B1 | 9/2005 | Swierczek |
| 7,268,288 | B2 | 9/2007 | Yamane et al. |
| 7,288,710 | B2 | 10/2007 | Gayama |
| 2002/0029684 | A1 | 3/2002 | Hasegawa et al. |
| 2002/0066358 | A1 | 6/2002 | Hasegawa et al. |
| 2003/0056636 | A1 | 3/2003 | Fukuda |
| 2004/0031377 | A1 | 2/2004 | Oshiyama et al. |
| 2006/0015333 | A1 | 1/2006 | Gao |
| 2006/0028077 | A1 | 2/2006 | Yamaguchi et al. |
| 2006/0065105 | A1 | 3/2006 | Iketani et al. |
| 2007/0227337 | A1 | 10/2007 | Yoshikawa et al. |

FOREIGN PATENT DOCUMENTS

| JP | 2003-203467 | 7/2003 |
| JP | 2005-332475 | 12/2005 |
| WO | WO 03/007128 | 1/2003 |

OTHER PUBLICATIONS

S.C. Kenyon, et al., High Capacity Real Time Broadcast Monitoring, IEEE, Proceeding of the International Conference, vol. 1, XP010054785, Oct. 13, 1991, pp. 147-152.

*Primary Examiner*—Marlon T Fletcher
(74) *Attorney, Agent, or Firm*—Oblon, Spivak, McClelland, Maier & Neustadt, P.C.

(57) ABSTRACT

Disclosed herein is a musical piece extraction program stored in a computer-readable storage medium, the program causing a computer to perform a process including the steps of, detecting a musical piece likeliness of each of pieces of processing-unit data that constitute input audio data, based on a result of the detection of the musical piece likeliness, identifying a musical piece candidate section within the audio data, based on the musical piece candidate section and musical piece information acquired from an external server, determining a musical piece section within the audio data, and recording the musical piece information onto a recording medium so as to be associated with the musical piece section.

8 Claims, 18 Drawing Sheets

FIG. 3

| RAN<br>BROADCASTING STATION NAME | OTI1<br>BROADCAST DATE/TIME | MN<br>MUSICAL PIECE NUMBER | MT<br>MUSICAL PIECE TITLE | ARN<br>ARTIST | JN<br>GENRE | |
|---|---|---|---|---|---|---|
| FM NAKAHARA | 12/01 20:03~20:05 | MUSICAL PIECE 1 | DORA DORA DORA | NAX | ROCK | ← OAM1 |
| FM NAKAHARA | 12/01 20:09~20:15 | MUSICAL PIECE 2 | BLUE TRIANGLE | DJC | POP | ← OAM2 |
| ... | ... | ... | ... | ... | ... | |
| FM NAKAHARA | 12/01 20:55~20:57 | MUSICAL PIECE 8 | WINTRY CYCLOTHYMIA | WALK en Cell | ROCK | ← OAMn |

OAT

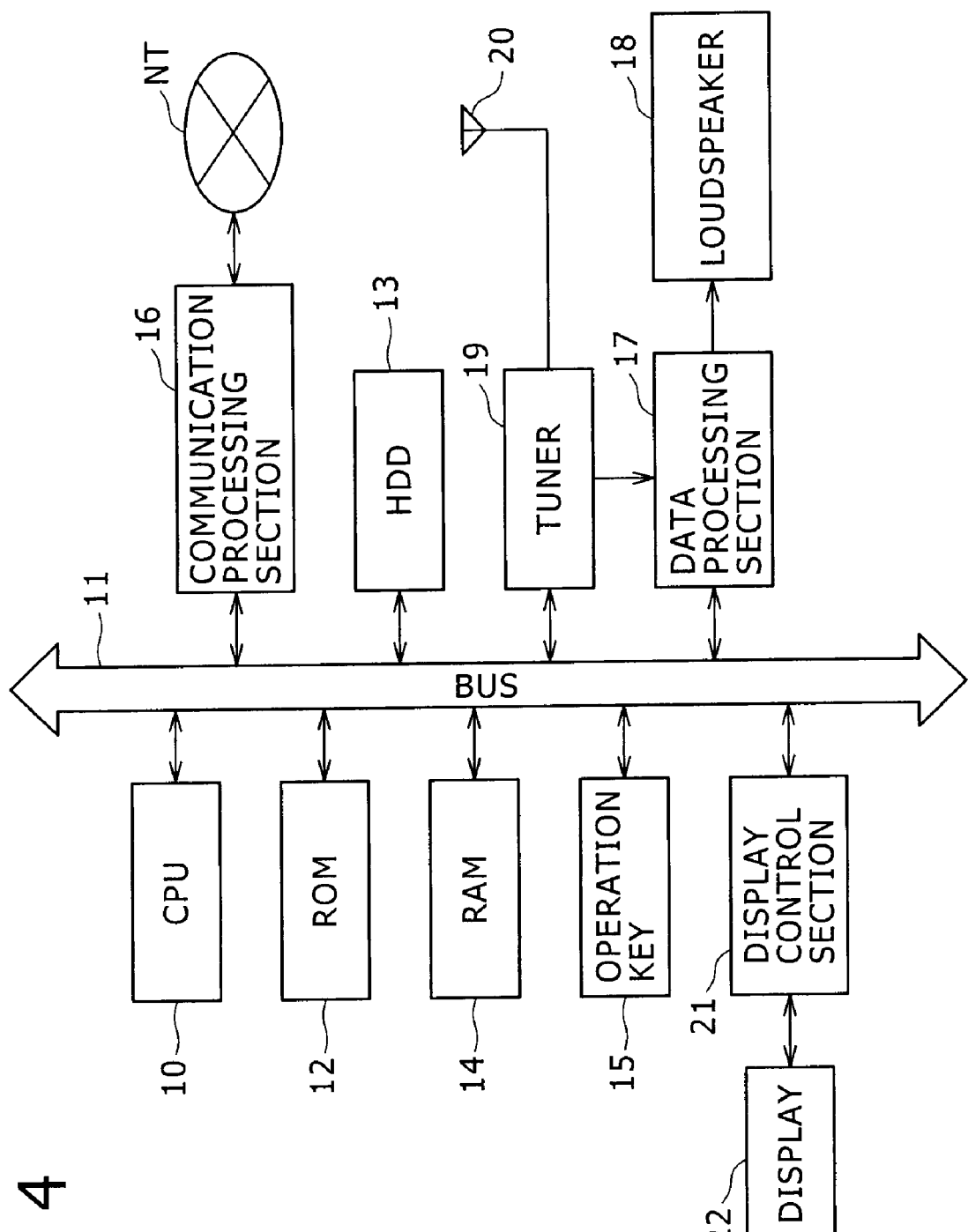
F I G. 4

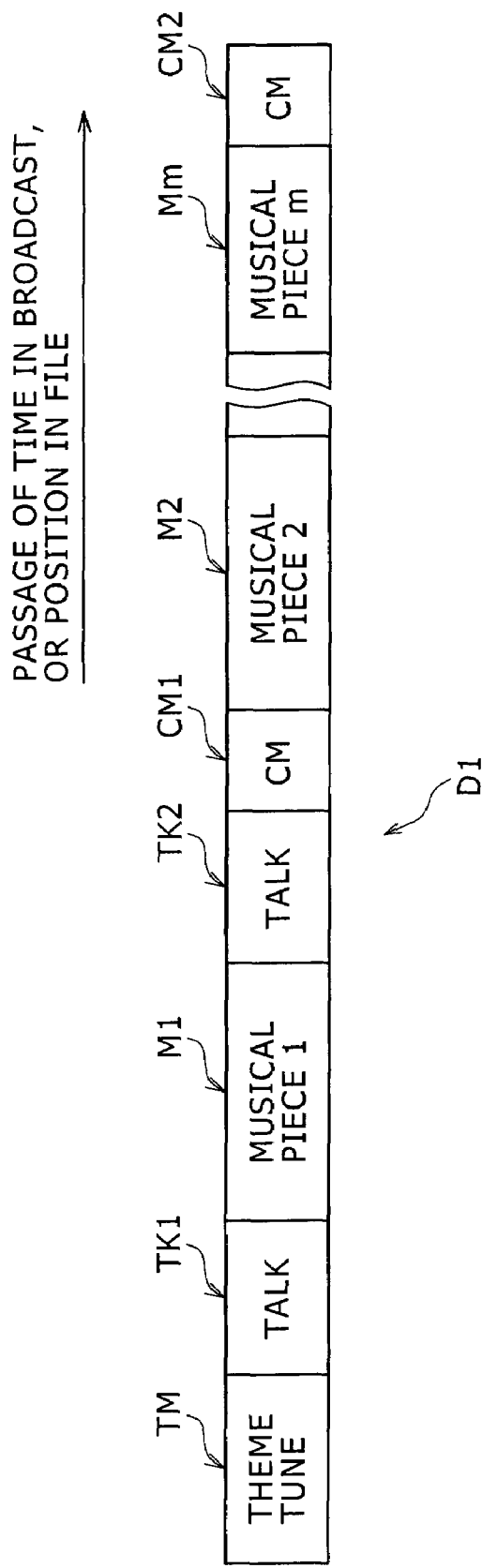

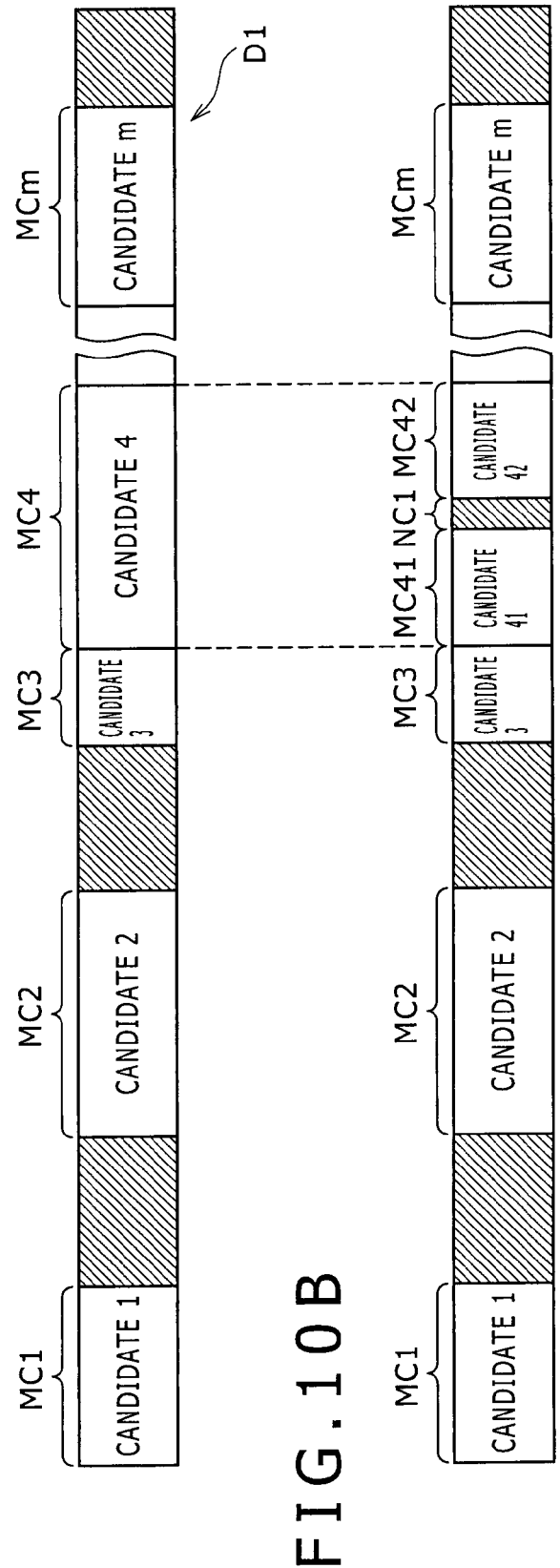

FIG. 11A

| BROADCASTING STATION NAME (RN) | MUSICAL PIECE CANDIDATE SECTION (MC) | SECTION NAME (AN) |
|---|---|---|
| FM NAKAHARA | 12/01 20:00:00~20:00:31 | CANDIDATE 1 |
| FM NAKAHARA | 12/01 20:03:05~20:05:25 | CANDIDATE 2 |
| FM NAKAHARA | 12/01 20:08:30~20:09:20 | CANDIDATE 3 |
| FM NAKAHARA | 12/01 20:09:31~20:15:03 | CANDIDATE 4 |
| ⋮ | ⋮ | ⋮ |
| FM NAKAHARA | 12/01 20:54:40~20:57:20 | CANDIDATE m |

MCT1

FIG. 11B

| BROADCASTING STATION NAME (RN) | MUSICAL PIECE CANDIDATE SECTION (MC) | SECTION NAME (AN) |
|---|---|---|
| FM NAKAHARA | 12/01 20:00:00~20:00:31 | CANDIDATE 1 |
| FM NAKAHARA | 12/01 20:03:05~20:05:25 | CANDIDATE 2 |
| FM NAKAHARA | 12/01 20:08:30~20:09:20 | CANDIDATE 3 |
| FM NAKAHARA | 12/01 20:09:31~20:12:05 | CANDIDATE 41 |
| FM NAKAHARA | 12/01 20:12:20~20:15:03 | CANDIDATE 42 |
| ⋮ | ⋮ | ⋮ |
| FM NAKAHARA | 12/01 20:54:40~20:57:20 | CANDIDATE m |

MCT2

FIG.12

| BROADCASTING STATION NAME (RAN) | BROADCAST DATE/TIME (OTI2) | MUSICAL PIECE NUMBER (MN) | MUSICAL PIECE TITLE (MT) | ARTIST (ARN) | GENRE (JN) |
|---|---|---|---|---|---|
| FM NAKAHARA | 12/01 20:03:05~20:05:25 | MUSICAL PIECE 1 | DORA DORA DORA | NAX | ROCK |
| FM NAKAHARA | 12/01 20:09:01~20:15:03 | MUSICAL PIECE 2 | BLUE TRIANGLE | DJC | POP |
| ... | ... | ... | ... | ... | ... |
| FM NAKAHARA | 12/01 20:54:40~20:57:20 | MUSICAL PIECE 8 | WINTRY CYCLOTHYMIA | WALK en Cell | ROCK |

ROAT

FIG.15A

| RN | MC | AN | MT | ARN | JN |
|---|---|---|---|---|---|
| BROADCASTING STATION NAME | MUSICAL PIECE CANDIDATE SECTION | SECTION NAME | MUSICAL PIECE TITLE | ARTIST | GENRE |
| FM NAKAHARA | 12/01 20:00:00~20:00:31 | CANDIDATE 1 | HALLO | CASSIOPEI | JAZZ |
| FM NAKAHARA | 12/01 20:03:05~20:05:25 | CANDIDATE 2 | DORA DORA DORA | NAX | ROCK |
| FM NAKAHARA | 12/01 20:08:30~20:09:20 | CANDIDATE 3 | NONE | NONE | NONE |
| FM NAKAHARA | 12/01 20:09:31~20:15:03 | CANDIDATE 4 | BLUE TRIANGLE | DJC | POP |
| ... | ... | ... | ... | ... | ... |
| FM NAKAHARA | 12/01 20:54:40~20:57:20 | CANDIDATE m | WINTRY CYCLOTHYMIA | WALK en Cell | ROCK |

MET

FIG. 15B

| RN<br>BROADCASTING STATION NAME | MC<br>MUSICAL PIECE CANDIDATE SECTION | AN<br>SECTION NAME | MT<br>MUSICAL PIECE TITLE | ARN<br>ARTIST | JN<br>GENRE |
|---|---|---|---|---|---|
| FM NAKAHARA | 12/01 20:00:00~20:00:31 | CANDIDATE 1 | HALLO | CASSIOPEI | JAZZ |
| FM NAKAHARA | 12/01 20:03:05~20:05:25 | CANDIDATE 2 | DORA DORA DORA | NAX | ROCK |
| FM NAKAHARA | 12/01 20:08:30~20:09:20 | CANDIDATE 3 | NONE | NONE | NONE |
| FM NAKAHARA | 12/01 20:09:31~20:12:05 | CANDIDATE 41 | BLUE TRIANGLE | DJC | POP |
| FM NAKAHARA | 12/01 20:12:20~20:15:03 | CANDIDATE 42 | BLUE TRIANGLE | DJC | POP |
| ... | ... | ... | ... | ... | ... |
| FM NAKAHARA | 12/01 20:54:40~20:57:20 | CANDIDATE m | WINTRY CYCLOTHYMIA | WALK en Cell | ROCK |

MET

MUSICAL PIECE EXTRACTION PROGRAM, APPARATUS, AND METHOD

CROSS REFERENCES TO RELATED APPLICATIONS

This application is a Continuation of and claims the benefit of priority under 35 U.S.C. § 120 from the U.S. Ser. No. 11/670,529, filed Feb. 2, 2007, and claims the benefit of priority under 35 U.S.C. § 119 from Japanese Patent Application JP 2006-039985, filed in the Japanese Patent Office on Feb. 16, 2006, the entire contents of which being incorporated herein by reference.

BACKGROUND OF THE INVENTION

1. Field of the Invention

The present invention relates to a musical piece extraction program, a musical piece extraction apparatus, and a musical piece extraction method which can, for example, be suitably applied to a data recording apparatus that records a radio program that is broadcast by a radio broadcasting station (hereinafter referred to as a "radio station") as program audio data and extracts, from the program audio data, musical piece data of a musical piece broadcast in the radio program.

2. Description of the Related Art

After storing a radio program broadcast by a radio station as program audio data, a related art data processing apparatus acquires from a server a playlist that contains titles (hereinafter referred to as "musical piece titles") of musical pieces broadcast in the radio program, an artist name(s), and a broadcast start time and broadcast end time of each of the musical pieces broadcast in the radio program such that the musical piece titles, the artist name(s), and the broadcast start times and broadcast end times are associated with one another. Then, the related art data processing apparatus extracts, from the program audio data, musical piece data of a musical piece, referring to the broadcast start time and broadcast end time of the musical piece contained in the playlist (see, for example, Japanese Patent Laid-Open No. 2003-203467 (pages 4 to 6)).

When receiving a radio program as program audio data in a situation where a user has inputted a keyword that indicates a desired musical piece, a related art recording apparatus temporarily stores, in a hard disk, program audio data corresponding to a period of a predetermined length of time (hereinafter referred to as a "holding time length") ending with the present time such that while the program audio data of the radio program is received, the temporarily stored program audio data is updated all the time as time progresses. In parallel with the temporary storage of the program audio data, the related art recording apparatus acquires, from a radio broadcast information distribution server, "now-on-air information" (which indicates the broadcast start time, musical piece title, artist name, genre name of a musical piece that is currently broadcast in the radio program) periodically, at intervals of a predetermined length (hereinafter referred to as an "acquisition time length") that is shorter than the holding time length, and determines whether the acquired now-on-air information contains information corresponding to the keyword. If it is determined that the now-on-air information contains the information corresponding to the keyword, the related art recording apparatus extracts, from the program audio data corresponding to a period of the holding time length as temporarily stored in the hard disk, a part of the program audio data that corresponds to a period of the acquisition time length ending with a time point at which the now-on-air information was received. Thereafter, the related art recording apparatus continues to record, on the hard disk, program audio data corresponding to a period from the time point at which the now-on-air information was received onward so as to follow the extracted program audio data, until the now-on-air information periodically acquired ceases to contain the information corresponding to the keyword. In the above-described manner, using the now-on-air information periodically acquired, the related art recording apparatus extracts, from the program audio data of the entire radio program, the musical piece data of a musical piece broadcast in the radio program, and records the extracted musical piece data on the hard disk (see, for example, Japanese Patent Laid-Open No. 2005-332475 (pages 43 to 45)).

SUMMARY OF THE INVENTION

The broadcast start time and broadcast end time of the musical piece contained in the playlist held in the server are expressed with minutes as a basic unit (i.e., with low precision) despite the fact that the broadcast of the musical piece in the radio program is actually started and ended on a more detailed basis, e.g., in units of seconds. Therefore, using the playlist, the related art data processing apparatus sometimes extract data of an introduction of the musical piece by a disk jockey, a commercial message, or the like broadcast in the radio program before or after the musical piece as extra data attached to the top or end of the musical piece data.

Meanwhile, the now-on-air information held in the radio broadcast information distribution server is updated in content when the broadcast of each musical piece in the radio program is started or ended. However, as with the playlist, the broadcast start time and broadcast end time of each musical piece contained in the now-on-air information are expressed with minutes as a basic unit (i.e., with low precision) despite the fact that the broadcast of the musical piece in the radio program is actually started and ended on a more detailed basis, e.g., in units of seconds. Moreover, the related art recording apparatus simply acquires, from the radio broadcast information distribution server, the now-on-air information periodically, at intervals of the acquisition time length, and the acquisition time length is not connected with times when the now-on-air information is updated in content. Furthermore, because the acquisition time length is set arbitrarily, using the part of the program audio data temporarily stored when extracting the musical piece data from the program audio data does not ensure that the top of that part of the program audio data coincides with the top of the musical piece. Accordingly, the related art recording apparatus also sometimes extracts data of the introduction of the musical piece by the disk jockey, the commercial message, or the like broadcast in the radio program before or after the musical piece as extra data attached to the top or end of the musical piece data. As described above, neither the related art data processing apparatus nor the related art recording apparatus can extract from the program audio data the musical piece data with high precision.

An advantage of the present invention is to provide a musical piece extraction program, a musical piece extraction apparatus, and a musical piece extraction method, which achieve improvement in precision with which the musical piece is extracted from broadcast information.

According to one embodiment of the present invention, there is provided a musical piece extraction program stored in a computer-readable storage medium, the program causing a computer to perform a process including the steps of: detecting a musical piece likeliness of each of pieces of processing-unit data that constitute input audio data; based on a result of the detection of the musical piece likeliness, identifying a musical piece candidate section within the audio data; based on the musical piece candidate section and musical piece information acquired from an external server, determining a musical piece section within the audio data; and recording the musical piece information onto a recording medium so as to be associated with the musical piece section.

According to another embodiment of the present invention, there is provided a musical piece extraction apparatus including: a musical piece likeliness detection section configured to detect a musical piece likeliness of each of pieces of processing-unit data that constitute input audio data; a musical piece candidate section identification section configured to, based on a result of detection of the musical piece likeliness by the musical piece likeliness detection section, identify a musical piece candidate section within the audio data; a musical piece information acquisition section configured to acquire musical piece information from an external server; a musical piece section determination section configured to, based on the musical piece candidate section identified by the musical piece candidate section identification section and the musical piece information acquired by the musical piece information acquisition section, determine a musical piece section within the audio data; and a musical piece information recording section configured to record the musical piece information onto a recording medium so as to be associated with the musical piece section.

According to yet another embodiment of the present invention, there is provided a musical piece extraction method including the steps of: detecting a musical piece likeliness of each of pieces of processing-unit data that constitute input audio data; based on a result of the detection of the musical piece likeliness, identifying a musical piece candidate section within the audio data; based on the musical piece candidate section and musical piece information acquired from an external server, determining a musical piece section within the audio data; and recording the musical piece information onto a recording medium so as to be associated with the musical piece section.

According to the above-described embodiments of the present invention, the musical piece section within the broadcast information is not determined simply by using the musical piece information. Instead, the musical piece candidate section (i.e., a section of the broadcast information that is likely to be musical piece data) is first identified within the broadcast information, and then, based on the musical piece candidate section and the musical piece information, the musical piece section is determined within the broadcast information. Thus, the musical piece section can be determined so as not to include a part of the broadcast information that corresponds to audio of an introduction of a musical piece, a commercial message, or the like that was broadcast before or after the musical piece.

BRIEF DESCRIPTION OF THE DRAWINGS

FIG. 3 is a diagram illustrating a structure of a broadcast musical piece table;

FIG. 4 is a block diagram illustrating a circuit structure of an exemplary data recording apparatus to which one embodiment of the present invention is applied;

FIG. 9 is a diagram illustrating a structure of program audio data;

FIGS. 10A and 10B are diagrams for explaining identification of musical piece candidate sections;

FIGS. 11A and 11B are diagrams illustrating structures of musical piece candidate section tables;

FIG. 12 is a diagram illustrating a structure of a time-corrected broadcast musical piece table;

FIGS. 15A and 15B are diagrams illustrating structures of musical piece extraction tables;

DETAILED DESCRIPTION OF THE PREFERRED EMBODIMENTS

Hereinafter, embodiments of the present invention will be described in detail with reference to the accompanying drawings.

1. Outline of Embodiment

Figure 1:
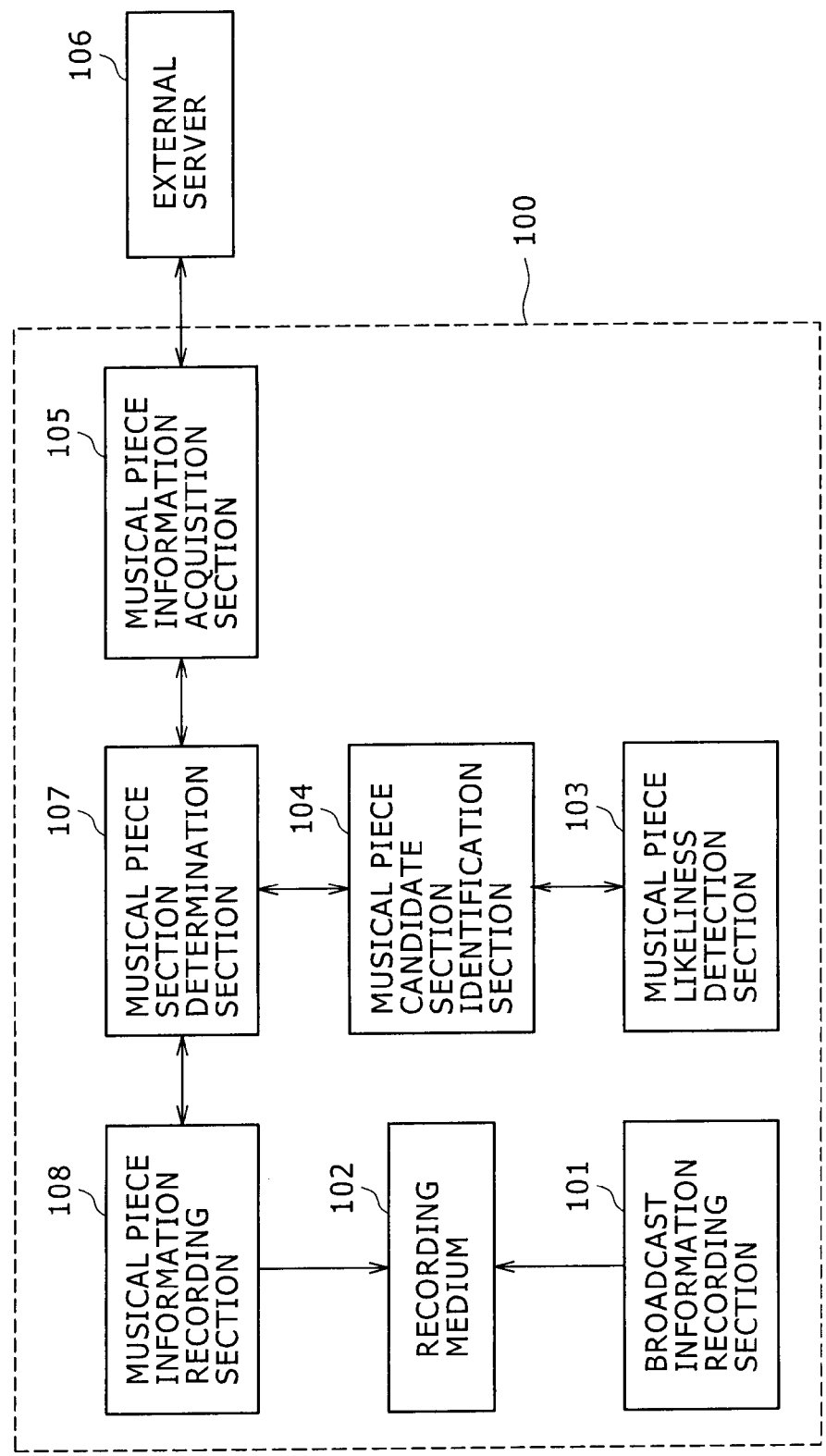
FIG. 1 is a block diagram illustrating an outline of a musical piece extraction apparatus according to one embodiment of the present invention.

In FIG. 1, reference numeral 100 denotes a musical piece extraction apparatus according to one embodiment of the present invention. The musical piece extraction apparatus 100 includes a broadcast information recording section 101, a recording medium 102, a musical piece likeliness detection section 103, a musical piece candidate section identification section 104, a musical piece information acquisition section 105, a musical piece section determination section 107, and a musical piece information recording section 108. The broadcast information recording section 101 records broadcast information on the recording medium 102. The musical piece likeliness detection section 103 detects a "musical piece likeliness" of each of the pieces of processing-unit data that constitute the broadcast information. The term "musical piece likeliness" as used herein refers to a numerical value that indicates to what degree data processed is likely to be musical piece data. Based on a result of the detection of the musical piece likeliness by the musical piece likeliness detection section 103, the musical piece candidate section identification section 104 identifies, within the broadcast information recorded on the recording medium 102, a "musical piece candidate section". The term "musical piece candidate section" as used herein refers to a section of the broadcast information that is likely to be musical piece data. The musical piece information acquisition section 105 acquires musical piece information from an external server 106. Based on the musical piece candidate section identified by the musical piece candidate section identification section 104 and the musical piece information acquired from the musical piece information acquisition section 105, the musical piece section determination section 107 determines a musical piece section within the broadcast information recorded on the recording medium 102. The term "musical piece section" as used herein refers to a section of the broadcast information that is musical piece data. The musical piece information recording section 108 records on the recording medium 102 the musical piece information so as to be associated with the musical piece section. In the above-described manner, the musical piece extraction apparatus 100 is capable of extracting from the broadcast information a musical piece as the musical piece section.

Note that, in the musical piece extraction apparatus 100, the broadcast information recording section 101 may record the broadcast information on the recording medium 102 after the musical piece likeliness detection section 103 detects the musical piece likeliness of each processing-unit data of the broadcast information while acquiring the broadcast information from the outside. Alternatively, while or after the broadcast information recording section 101 records the broadcast information on the recording medium 102, the musical piece likeliness detection section 103 may detect the musical piece likeliness of each processing-unit data of the broadcast information recorded on the recording medium 102. Also note that, in the musical piece extraction apparatus 100, the musical piece information recording section 108 may acquire the musical piece information to be recorded on the recording medium 102 so as to be associated with the musical piece section either from the musical piece section determination section 107 or from the musical piece information acquisition section 105.

2. Embodiment

Figure 2:
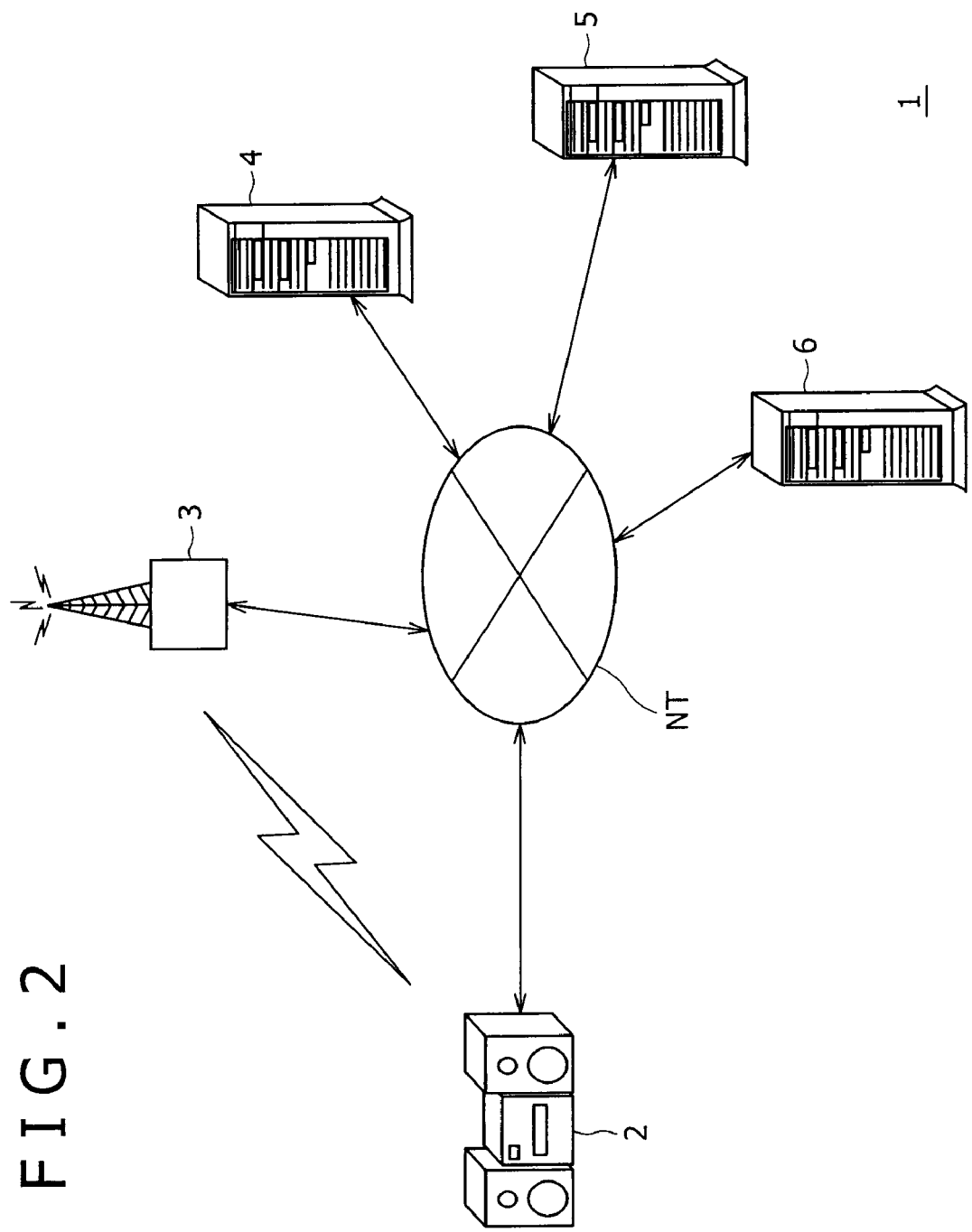
FIG. 2 is an illustration of an overall configuration of a musical piece acquisition system according to one embodiment of the present invention.

FIG. 2 shows an overall configuration of a musical piece acquisition system 1 including a data recording apparatus 2 to which an embodiment of the present invention is applied. In FIG. 2, the data recording apparatus 2 receives an analog program audio signal of a radio program broadcast by a radio broadcasting station (hereinafter referred to as a "radio station") 3, and records the received program audio signal as digital program audio data. In addition, the data recording apparatus 2 is connected to a radio broadcast information distribution server 4, a musical piece information search server 5, and a musical piece distribution server 6 via a network NT, such as the Internet, so as to be capable of communicating with the servers 4 to 6.

In this case, the radio broadcast information distribution server 4 is managed by the radio station 3, for example, and holds a data table (hereinafter referred to as a "broadcast musical piece table") OAT called "on-air-list information". As illustrated in FIG. 3, pieces of musical piece information (hereinafter referred to as "broadcast musical piece information") OAM1 to OAMn concerning musical pieces broadcast in the radio program by the radio station 3 are registered in the broadcast musical piece table OAT. The pieces of broadcast musical piece information OAM1 to OAMn have almost the same structure as information for scheduling the radio program broadcast by the radio station 3. For example, the pieces of broadcast musical piece information OAM1 to OAMn are each composed of: a broadcasting station name RAN of the radio station 3 that broadcasts the radio program; broadcast date/time information OTI1 concerning a musical piece broadcast in the radio program (i.e., information composed of an airdate, broadcast start time, and broadcast end time of the musical piece); a musical piece number MN; a title (hereinafter referred to as a "musical piece title") MT of the musical piece; an artist name ARN; a genre name (i.e., a name of a genre of the musical piece) JN; etc.

In the case where the radio station 3 broadcasts a radio program already produced, the radio broadcast information distribution server 4 registers, prior to the broadcast of the radio program, the pieces of broadcast musical piece information OAM1 to OAMn concerning all musical pieces to be broadcast in the radio program in the broadcast musical piece table OAT. Meanwhile, in the case where the radio station 3 broadcasts a radio program live, the radio broadcast information distribution server 4 generates, each time a musical piece is broadcast in the live radio program, a corresponding one of the pieces of the broadcast musical piece information OAM1 to OAMn, and registers it in the broadcast musical piece table OAT during or after the live broadcasting of the radio program. Then, if the data recording apparatus 2, having recorded the radio program broadcast by the radio station 3 as the program audio data, requests the pieces of broadcast musical piece information OAM1 to OAMn concerning all the musical pieces broadcast in the radio program, the radio broadcast information distribution server 4 presents the pieces of broadcast musical piece information OAM1 to OAMn requested in the form of the broadcast musical piece table OAT to the data recording apparatus 2 via the network NT.

The musical piece information search server 5 holds musical piece information for presentation use (hereinafter referred to as "presentation-use musical piece information") concerning each of a large number of musical pieces. Individual pieces of presentation-use musical piece information are each composed of, for example, a musical piece title, artist name, genre name, etc., of a musical piece. In addition, the musical piece information search server 5 analyzes an analog audio waveform of each of the large number of musical pieces, for example, and generates, based on the analysis, identification information (hereinafter referred to as "musical piece fingerprint information") of each musical piece for identifying the musical piece. The musical piece information search server 5 holds each of the pieces of musical piece fingerprint information generated such that each piece of musical piece fingerprint information is associated with the presentation-use musical piece information of a musical piece that is identified by that piece of musical piece fingerprint information.

If the data recording apparatus 2 presents the musical piece fingerprint information to the musical piece information search server 5 to request the musical piece information search server 5 to search for particular presentation-use musical piece information as described later, the musical piece information search server 5 compares the presented musical piece fingerprint information (hereinafter referred to particularly as "apparatus-presented musical piece fingerprint information") with the large number of pieces of musical piece fingerprint information held in the musical piece information search server 5. Based on a result of the comparison, the musical piece information search server 5 retrieves, from among the large number of pieces of presentation-use musical piece information, presentation-use musical piece information that is associated with musical piece fingerprint information that corresponds to the apparatus-presented musical piece fingerprint information, and transmits the retrieved presentation-use musical piece information to the data recording apparatus 2 via the network NT. In the above-described manner, the musical piece information search server 5 is capable of retrieving the presentation-use musical piece information and presenting the retrieved presentation-use musical piece information to the data recording apparatus 2, as realized by a presentation-use musical piece information search service provided by Gracenote, Inc. or MoodLogic, Inc., for example.

The musical piece distribution server 6 holds a large number of musical pieces for sale in the form of musical piece data in a format such as ATRAC3 (Adaptive Transform Acoustic Coding 3), AAC (Advanced Audio Coding), WMA (Windows Media Audio (registered trademark)), RealAudio G2 Music Codec, MP3 (MPEG Audio Layer-3), or the like. In addition, the musical piece distribution server 6 holds sample data of each of the large number of musical pieces, each piece of sample data being composed of a part of the corresponding musical piece data, for example, and to be reproduced for a potential purchaser to check the corresponding musical piece. Moreover, the musical piece distribution server 6 also holds the musical piece information concerning each of the large number of musical pieces, each piece of musical piece information being composed of the musical piece title, the artist name, the genre name, etc., such that each piece of musical piece information is associated with the corresponding musical piece data and sample data.

If the data recording apparatus 2 presents, to the musical piece distribution server 6, musical piece information (hereinafter referred to particularly as "associated musical piece information") associated with musical piece data, the musical piece distribution server 6 detects, from among the large number of pieces of musical piece information, a piece of musical piece information that corresponds to the associated musical piece information, and transmits, in a streaming format, for example, a piece of sample data associated with the piece of musical piece information detected to the data recording apparatus 2 via the network NT. Thus, the musical piece distribution server 6 allows a user to check the musical piece based on the piece of sample data by means of the data recording apparatus 2. If, as a result, the user decides to purchase the checked musical piece and the musical piece distribution server 6 receives from the data recording apparatus 2 a request to purchase the musical piece, the musical piece distribution server 6 transmits the musical piece data of the checked musical piece (i.e., the musical piece data associated with the previously detected musical piece information) to the data recording apparatus 2 via the network NT. At this time, the musical piece distribution server 6 performs a charging process to charge to the user of the data recording apparatus 2 a fee for delivery of the musical piece data. In the above-described manner, the musical piece distribution server 6 is capable of allowing the user to purchase the musical piece data by delivering the musical piece data to the data recording apparatus 2.

As illustrated in FIG. 4, in the data recording apparatus 2, a central processing unit (CPU) 10 and various hardware components are connected via a bus 11, and the central processing unit 10 exercises centralized control over the whole of the data recording apparatus 2 by reading various programs, such as a musical piece extraction program, from a read only memory (ROM) 12 or a hard disk drive (HDD) 13 and executing the programs in a random access memory (RAM) 14, and also performs various processes. If a request to acquire a musical piece available from the musical piece distribution server 6 is issued by the user via an operation key 15 provided on a case of the data recording apparatus 2, for example, the central processing unit 10 transmits a "musical piece delivery request signal" for requesting the delivery of the musical piece to the musical piece distribution server 6 on the network NT via a communication processing section 16. At this time, upon receipt of the musical piece delivery request signal transmitted from the data recording apparatus 2, the musical piece distribution server 6 performs the charging process that involves the delivery of the requested musical piece data and transmits the requested musical piece data to the data recording apparatus 2 via the network NT. Then, the central processing unit 10 of the data recording apparatus 2 receives the musical piece data transmitted from the musical piece distribution server 6 via the communication processing section 16, and records the received musical piece data on the hard disk drive 13. In the above-described manner, the central processing unit 10 is capable of acquiring (i.e., downloading) the musical piece data from the musical piece distribution server 6 on the network NT.

If, thereafter, a request to reproduce the musical piece data is issued by the user via the operation key 15, the central processing unit 10 reads the requested musical piece data from the hard disk drive 13 and supplies the read musical piece data to a data processing section 17. The data processing section 17 subjects the musical piece data supplied by the central processing unit 10 to a digital process, such as decoding, and thereafter subjects the resultant musical piece data to an analog process, such as digital to analog conversion and amplification. The data processing section 17 thus generates a musical piece signal by the analog process and supplies the generated musical piece signal to a loudspeaker 18 so that a musical piece based on the musical piece signal is outputted via the loudspeaker 18 for the user to listen to the musical piece. In the above-described manner, the central processing unit 10 is capable of reproducing the musical piece data recorded on the hard disk drive 13.

If a request to listen to the radio program is issued via the operation key 15 with the radio station 3 selected, the central processing unit 10 sets a tuner 19 so as to operate while extracting a radio broadcast wave of the radio station 3 selected by the user from the radio broadcast waves of a plurality of radio stations 3. At this time, the central processing unit 10 also controls the data processing section 17 to operate for the user to listen to the radio program. Thus, the tuner 19 extracts, from the radio broadcast waves of the plurality of radio stations 3 received by an antenna 20, the radio broadcast wave of the radio station 3 selected by the user; performs a predetermined reception process, such as demodulation, on the extracted radio broadcast wave to obtain a program audio signal of the radio program; and supplies the obtained program audio signal to the data processing section 17. The data processing section 17 subjects the program audio signal supplied from the tuner 19 to a digital process, such as analog to digital conversion and equalization, to obtain program audio data, and subjects the obtained program audio data to an analog process, such as the digital to analog conversion and the amplification. The data processing section 17 thus generates the program audio signal by the analog process and supplies the generated program audio signal to the loudspeaker 18 so that a program audio based on the program audio signal is outputted via the loudspeaker 18 for the user to listen to the program audio. In the above-described manner, the central processing unit 10 enables the user to listen to the radio program broadcast by the desired radio station 3.

Further, if a request to record the radio program is issued via the operation key 15 with the radio station 3 selected, the central processing unit 10 sets the tuner 19 so as to operate while extracting the radio broadcast wave of the radio station 3 selected by the user, in a manner similar to that described above. At this time, the central processing unit 10 also controls the data processing section 17 to operate for recording of the radio program. As a result, the tuner 19 extracts, from the radio broadcast waves of the plurality of radio stations 3 received by the antenna 20, the radio broadcast wave of the radio station 3 selected by the user and performs the reception process on the extracted radio broadcast wave to obtain a program audio signal of the radio program, and supplies the obtained program audio signal to the data processing section 17. The data processing section 17 subjects the program audio signal supplied from the tuner 19 to the digital process to obtain program audio data, and supplies the obtained program audio data to the central processing unit 10. Then, the central processing unit 10 supplies the program audio data to the hard disk drive 13 to record thereon the program audio data as a data file (hereinafter referred to as a "program audio file"). In the above-described manner, the central processing unit 10 is capable of recording the radio program broadcast by the desired radio station 3. Note that, after recording the radio program, the central processing unit 10 is capable of reading the program audio data from the hard disk drive 13 and performing a reproduction process on the read program audio data to allow the user to listen to the radio program, in a manner similar to that described above with respect to the reproduction of the musical piece data.

Further, the central processing unit 10 supplies to a display control section 21 data for display use in accordance with a result of execution of the various programs read from the ROM 12 (examples of such a result include the acquisition and reproduction of the musical piece data, the listening and recording of the radio program, etc.). The display control section 21 displays, on a display 22, a screen based on the data for display use supplied by the central processing unit 10. In the above-described manner, the central processing unit 10 is capable of presenting various screens concerning the acquisition and reproduction of the musical piece data, the listening and recording of the radio program, and the like to the user for viewing via the display 22.

Figure 5:
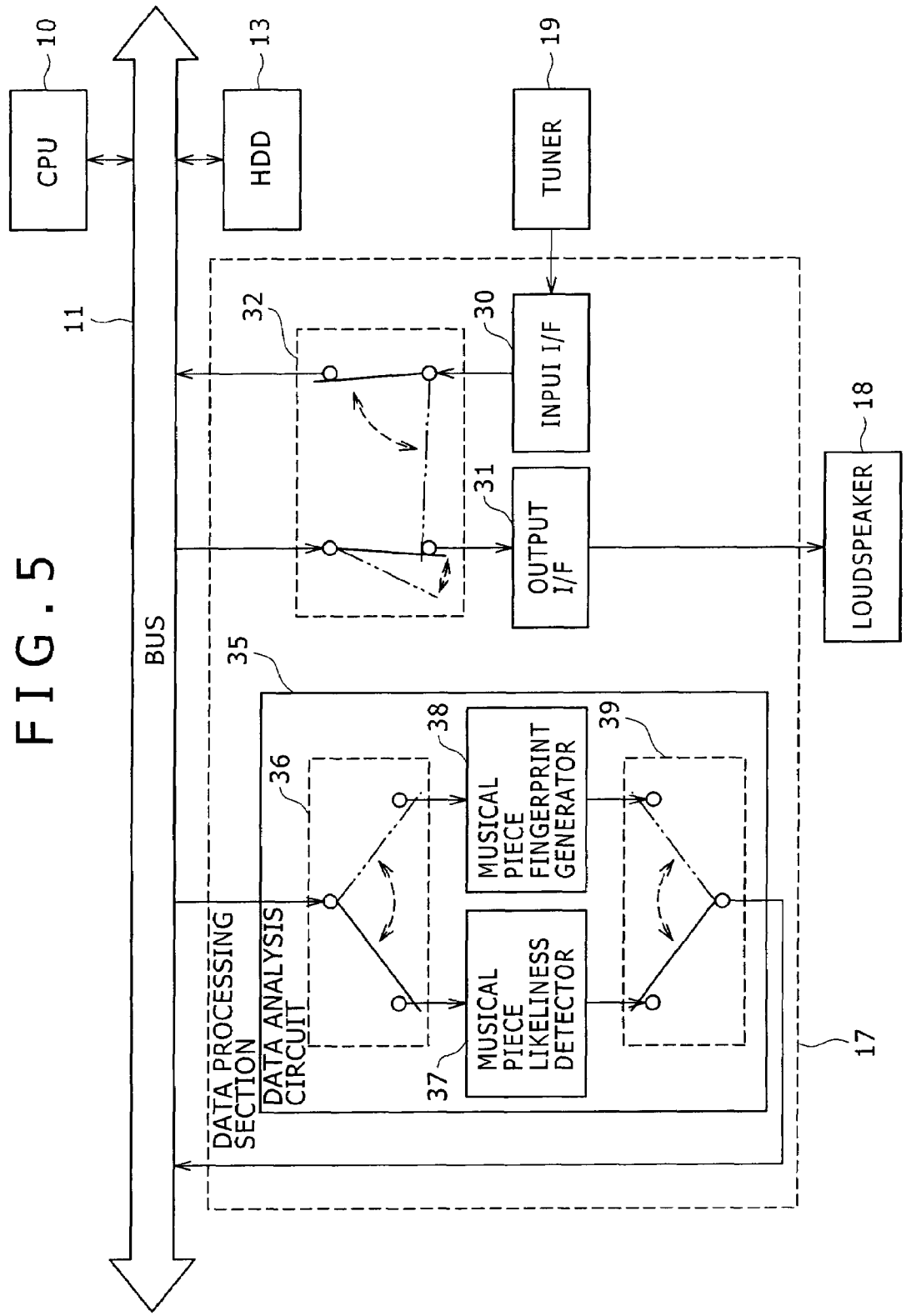
FIG. 5 is a block diagram illustrating a circuit structure of a data processing section.

As illustrated in FIG. 5, in the data processing section 17, an input interface 30 connected to the tuner 19 and an output interface 31 connected to the loudspeaker 18 are both connected to an input/output switch 32. At the time of reproducing the musical piece data, the input/output switch 32 of the data processing section 17, under control of the central processing unit 10, disconnects the output interface 31 from the input interface 30 and connects the output interface 31 to the bus 11. Thus, the output interface 31 performs the digital process, such as the decoding, on the musical piece data supplied from the central processing unit 10 via the input/output switch 32 and thereafter performs the analog process, such as the digital to analog conversion and the amplification, on the resultant musical piece data to obtain the musical piece signal, and supplies the obtained musical piece signal to the loudspeaker 18.

Further, at the time of listening to the radio program, the input/output switch 32 of the data processing section 17, under control of the central processing unit 10, disconnects both the input interface 30 and the output interface 31 from the bus 11 and connects the input interface 30 and the output interface 31 to each other. Thus, the input interface 30 performs the digital process, such as the analog to digital conversion and the equalization, on the program audio signal supplied from the tuner 19 to obtain the program audio data, and supplies the obtained program audio data to the output interface 31 via the input/output switch 32. Then, the output interface 31 performs the analog process, such as the digital to analog conversion and the amplification, on the program audio data supplied from the input interface 30 to obtain the program audio signal, and supplies the obtained program audio signal to the loudspeaker 18. Still further, at the time of recording the radio program, the input/output switch 32 of the data processing section 17, under control of the central processing unit 10, disconnects the input interface 30 from the output interface 31 and connects the input interface 30 to the bus 11. Thus, the input interface 30 performs the digital process, such as the analog to digital conversion, on the program audio signal supplied from the tuner 19 to obtain the program audio data, and supplies the obtained program audio data to the central processing unit 10 via the input/output switch 32.

In addition to the above-described components, the data processing section 17 includes a data analysis circuit 35. As illustrated in FIG. 5, the data analysis circuit 35 includes an input switch 36, a musical piece likeliness detector 37, a musical piece fingerprint generator 38, and an output switch 39. The input switch 36 and the output switch 39 are both connected to the bus 11. An input terminal of the musical piece likeliness detector 37 and an input terminal of the musical piece fingerprint generator 38 are connected to the input switch 36. An output terminal of the musical piece likeliness detector 37 and an output terminal of the musical piece fingerprint generator 38 are connected to the output switch 39. In this case, the musical piece likeliness detector 37 of the data analysis circuit 35 is capable of detecting the musical piece likeliness of data to be processed. As mentioned previously, the musical piece likeliness is a numerical value that indicates to what degree data processed is likely to be musical piece data. The musical piece fingerprint generator 38 of the data analysis circuit 35 analyzes, for example, the analog audio waveform of partial data (hereinafter referred to as "musical piece candidate section data") corresponding to the musical piece candidate section that is identified within the data processed based on the result of the detection of the musical piece likeliness by the musical piece likeliness detector 37, and, based on the analysis, generates the apparatus-presented musical piece fingerprint information as the above-described musical piece information search server 5 generates the musical piece fingerprint information.

If a request to record the radio program is issued by the user via the operation key 15 with an intention to automatically extract the musical piece, the central processing unit 10 controls the data analysis circuit 35 in the data processing section 17 accordingly. Thus, the data analysis circuit 35 uses the input switch 36 and the output switch 39 to connect both the input terminal and the output terminal of the musical piece likeliness detector 37 to the bus 11. Then, while recording the program audio data supplied from the data processing section 17 on the hard disk drive 13 in the above-described manner, the central processing unit 10, in parallel with the recording process, supplies the program audio data to the data analysis circuit 35 such that the pieces of processing-unit data that constitute the program audio data are inputted to the data analysis circuit 35 sequentially, one piece of processing-unit data at a time. The processing-unit data is data of a predetermined size and corresponds, for example, to a part of the program audio data that corresponds to approximately one second of the radio program. That is, the musical piece likeliness detector 37 of the data analysis circuit 35 receives the pieces of processing-unit data sequentially supplied by the central processing unit 10 via the input switch 36. Then, the musical piece likeliness detector 37 detects the musical piece likeliness of each of the pieces of processing-unit data, and thus, eventually, detects the musical piece likeliness with respect to the entire program audio data. Note that the musical piece likeliness in this case refers to a numerical value that indicates to what degree each piece of processing-unit data is likely to be musical piece data of a musical piece broadcast in the radio program.

There are, for example, two types of techniques that can be adopted by the musical piece likeliness detector 37 for detecting the musical piece likeliness. Of the two types of musical piece likeliness detection techniques, a first musical piece likeliness detection technique takes advantage of the fact that frequency components of human voices are distributed over comparatively lower frequencies whereas frequency components of sounds such as those produced by musical instruments are distributed over comparatively higher frequencies. Specifically, the first musical piece likeliness detection technique subjects the processing-unit data to frequency analysis and detects the musical piece likeliness of the processing-unit data based on the analysis. Meanwhile, a second musical piece likeliness detection technique takes advantage of the fact that since the encoding (i.e., compression) of audio data is generally performed while modeling the mechanism of the generation of the human voices, a difference (hereinafter referred to as an "encoding difference") between the original waveform of non-voice data, such as musical piece data or the like, and a waveform of data obtained by once encoding and then decoding (i.e., a codec process) the non-voice data is larger than the encoding difference of voice data. In other words, the second musical piece likeliness detection technique detects the musical piece likeliness of the processing-unit data based on the encoding difference thereof. One of the two types of musical piece likeliness detection techniques is adopted by the musical piece likeliness detector 37. The two types of musical piece likeliness detection techniques will now be described below one after the other.

Figure 6:
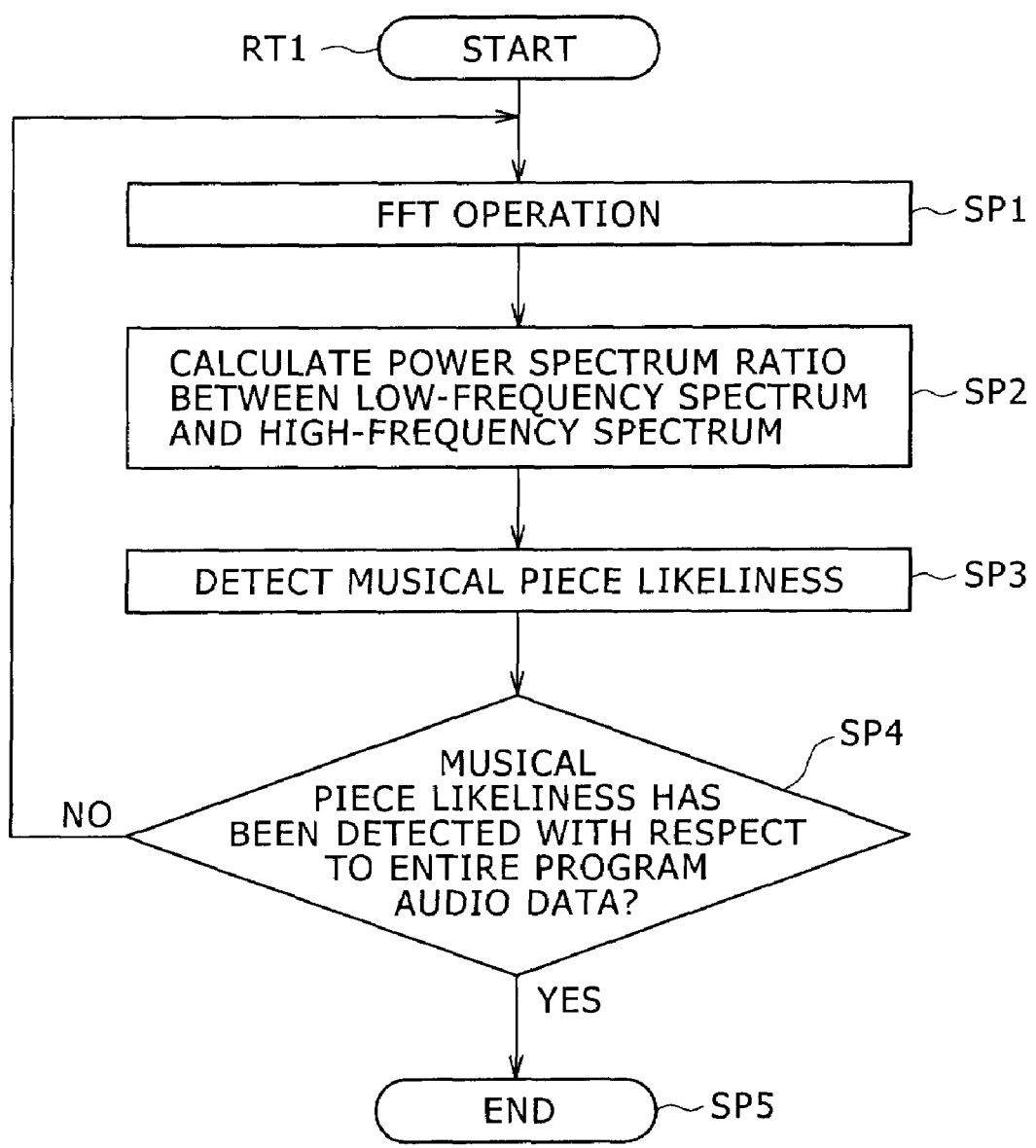
FIG. 6 is a flowchart illustrating a musical piece likeliness detection procedure.

First, in the case where the first musical piece likeliness detection technique is adopted by the musical piece likeliness detector 37, the musical piece likeliness detector 37, under control of the central processing unit 10, starts a musical piece likeliness detection procedure RT1 as illustrated in FIG. 6 in accordance with a musical piece likeliness detection program previously stored in an internal memory. After starting the musical piece likeliness detection procedure RT1, the musical piece likeliness detector 37 takes in the processing-unit data supplied by the central processing unit 10 at step SP1. The processing-unit data is, for example, composed of 1024 data samples taken from the program audio data to which time codes indicative of points in time in the broadcast of the radio program are added, the first (i.e., earliest in time) of the 1024 data samples corresponding to a time t indicated by one of the time codes. Then, the musical piece likeliness detector 37 subjects the processing-unit data to fast Fourier transform (FFT) to analyze the processing-unit data into a frequency spectrum sp, and proceeds to step SP2.

At step SP2, the musical piece likeliness detector 37 divides the frequency spectrum sp into low-frequency spectrum components spn and high-frequency spectrum components spn with, for example, a frequency of 8 kHz as a boundary therebetween. In the case where a sampling frequency for the program audio data is 44.1 kHz, the low-frequency spectrum components spn range from sp0 to sp185, whereas the high-frequency spectrum components spn range from sp186 to sp511. In addition, while squaring the magnitude components of the low-frequency spectrum components sp0 to sp185, the musical piece likeliness detector 37 determines a low-frequency power spectrum a using the following expression (1):

$$a = \sum_{n=0}^{185} (sp_n)^2 \qquad (1)$$

Similarly, while squaring the magnitude components of the high-frequency spectrum components sp186 to sp511, the musical piece likeliness detector 37 determines a high-frequency power spectrum b using the following expression (2):

$$b = \sum_{n=186}^{511} (sp_n)^2 \qquad (2)$$

Then, the musical piece likeliness detector 37 calculates a ratio (hereinafter referred to as a "power spectrum ratio") Rt between the low-frequency power spectrum a and the high-frequency power spectrum b using the following expression (3):

$$R_t = \frac{b}{a} \qquad (3)$$

Then, control proceeds to step SP3.

At step SP3, using a method of moving average, the musical piece likeliness detector 37 determines a value x of a moving average of n power spectrum ratios Rt-n calculated up to the present time using the following expression (4):

$$x = \sum_{m=t-n+1}^{t} R_m \div n \qquad (4)$$

and regards the value x of the moving average as a value (hereinafter referred to as a "musical piece likeliness value") representing the musical piece likeliness. Then, the musical piece likeliness detector 37 sends the musical piece likeliness value to the central processing unit 10 via the output switch 39, and proceeds to step SP4.

At step SP4, the musical piece likeliness detector 37 determines whether the detection of the musical piece likeliness has been performed with respect to all pieces of processing-unit data that constitute the program audio data. If the determination at this step is negative, i.e., if there is any processing-unit data yet to be taken in from the central processing unit 10 and the detection of the musical piece likeliness has not been completed yet, the musical piece likeliness detector 37 returns to step SP1. Then, the musical piece likeliness detector 37 repeats the processes of steps SP1 to SP4 cyclically until the determination at step SP4 becomes affirmative. If the determination at step SP4 is affirmative, i.e., if the detection of the musical piece likeliness has been performed with respect to all pieces of processing-unit data that constitute the program audio data, the musical piece likeliness detector 37 proceeds to step SP5, thereby finishing the musical piece likeliness detection procedure RT1. As is apparent from the above expression (3), the musical piece likeliness value becomes comparatively low for a portion of the program audio data where the human voice is predominant, whereas the musical piece likeliness value becomes comparatively high for a portion of the program audio data where the musical instrument sound or the like (i.e., a sound other than the human voice) is predominant. Taking advantage of this fact, the musical piece likeliness detector 37 detects the musical piece likeliness of each of the pieces of processing-unit data of the program audio data sequentially.

Figure 7:
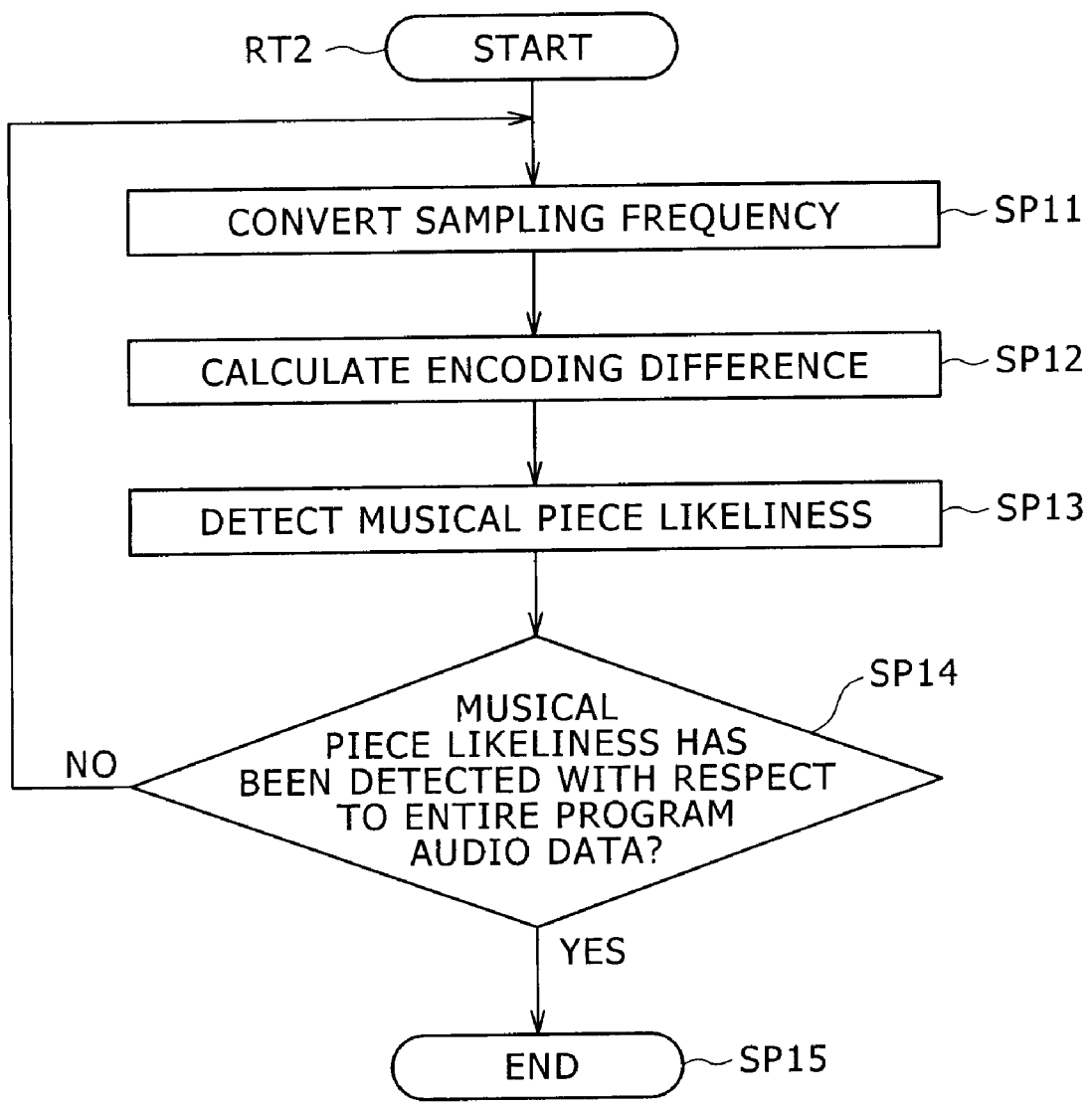
FIG. 7 is a flowchart illustrating another musical piece likeliness detection procedure.

Meanwhile, in the case where the second musical piece likeliness detection technique is adopted by the musical piece likeliness detector 37, the musical piece likeliness detector 37, under control of the central processing unit 10, starts a musical piece likeliness detection procedure RT2 as illustrated in FIG. 7 in accordance with the musical piece likeliness detection program previously stored in the internal memory. After starting the musical piece likeliness detection procedure RT2, the musical piece likeliness detector 37 takes in the processing-unit data within the program audio data supplied by the central processing unit 10 at step SP11. The processing-unit data is, for example, composed of 200 data samples taken from the program audio data, the first (i.e., earliest in time) of the 200 data samples corresponding to a time t indicated by a time code added to the program audio data. Then, the musical piece likeliness detector 37 converts the sampling frequency of the processing-unit data, and proceeds to step SP12. At this time, the musical piece likeliness detector 37 converts the sampling frequency of the processing-unit data to 8 or 16 kHz, for example, so as to be adjusted to a frequency that can be dealt with in the subsequent codec process (e.g., a codec process that complies with Code Excited Linear Prediction (CELP)).

At step SP12, the musical piece likeliness detector 37 performs the codec process on the processing-unit data (i.e., once encodes and then decodes the processing-unit data). Then, the musical piece likeliness detector 37 calculates the encoding difference Et based on an original waveform c of the processing-unit data and a waveform d of the data (which is, for example, composed of 200 data samples as is the processing-unit data) obtained by performing the codec process on the processing-unit data while comparing corresponding data samples with each other, using the following expression (5):

$$E_t = \sum_{n=0}^{100} |c_{t+n} - d_{t+delay-n}| \quad (5)$$

Then, control proceeds to step SP13. Note that when the above expression (5) is used for calculation of the encoding difference Et, the musical piece likeliness detector 37 calculates the encoding difference Et while taking into account a delay between the start of the codec process for the processing-unit data and the end of the codec process for the processing-unit data.

At step SP13, using the method of moving average, the musical piece likeliness detector 37 determines a value x of the moving average of n encoding differences Et calculated up to the present time using the following expression (6):

$$x = \sum_{m=t-n+1}^{t} E_m \div n \quad (6)$$

and regards the value x of the moving average as the musical piece likeliness value. Then, the musical piece likeliness detector 37 sends the musical piece likeliness value to the central processing unit 10 via the output switch 39, and proceeds to step SP14.

At step SP14, the musical piece likeliness detector 37 determines whether the detection of the musical piece likeliness has been performed with respect to all pieces of processing-unit data that constitute the program audio data. If the determination at this step is negative, i.e., if there is any processing-unit data yet to be taken in from the central processing unit 10 and the detection of the musical piece likeliness has not been completed yet, the musical piece likeliness detector 37 returns to step SP11. Then, the musical piece likeliness detector 37 repeats the processes of steps SP11 to SP14 cyclically until the determination at step SP14 becomes affirmative. If the determination at step SP14 is affirmative, i.e., if the detection of the musical piece likeliness has been performed with respect to all pieces of processing-unit data that constitute the program audio data, the musical piece likeliness detector 37 proceeds to step SP15, thereby finishing the musical piece likeliness detection procedure RT2. As is apparent from the above expression (5), the musical piece likeliness value becomes comparatively low for a portion of the program audio data where the human voice is predominant, whereas the musical piece likeliness value becomes comparatively high for a portion of the program audio data where the musical instrument sound or the like (i.e., a sound other than the human voice) is predominant. Taking advantage of this fact, the musical piece likeliness detector 37 detects the musical piece likeliness of each of the pieces of processing-unit data of the program audio data sequentially.

Figure 8:
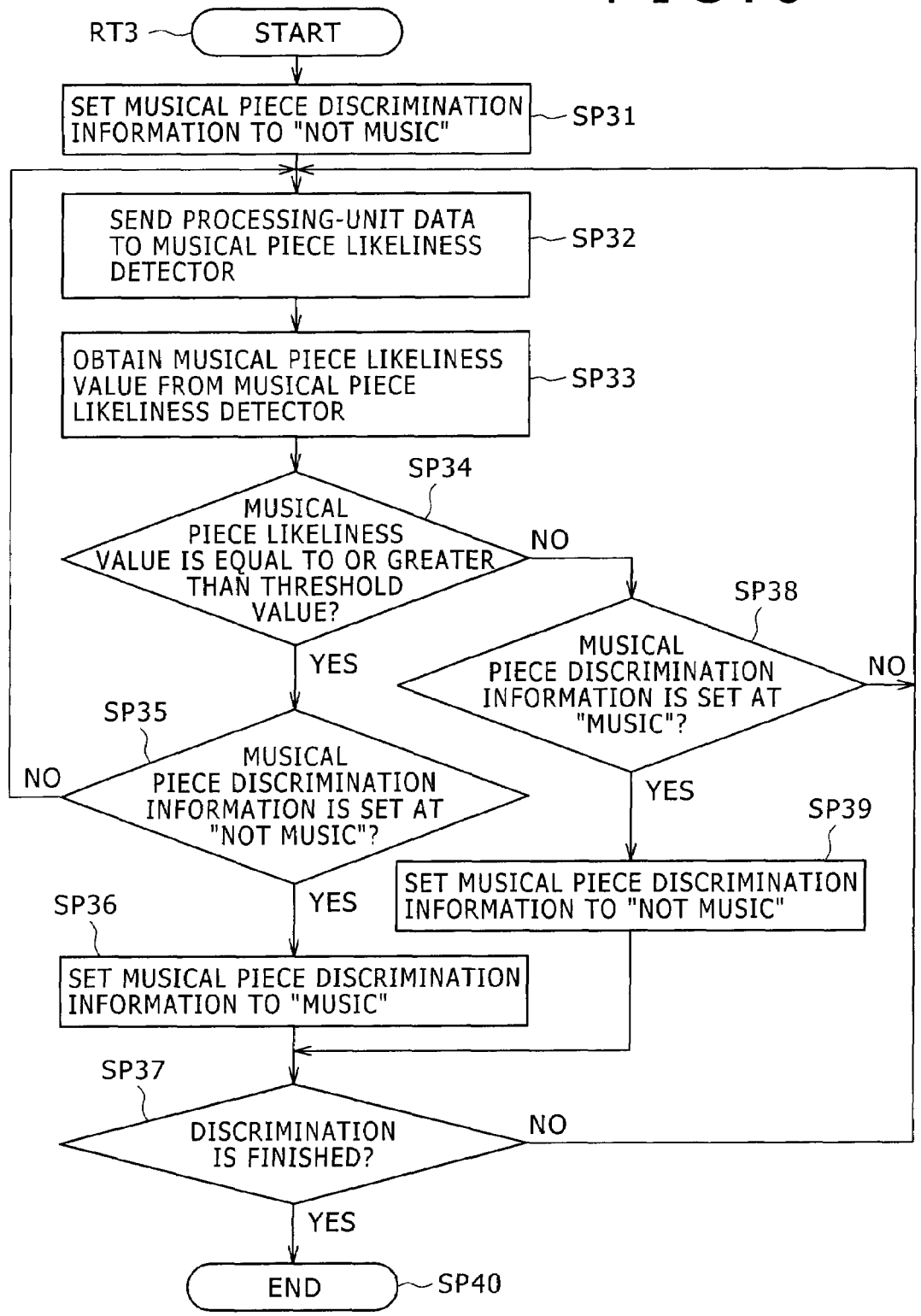
FIG. 8 is a flowchart illustrating a musical piece discrimination procedure.

While sending the program audio data to the musical piece likeliness detector 37 in the form of the pieces of processing-unit data sequentially to detect the musical piece likeliness thereof as described above, the central processing unit 10, in parallel with the musical piece likeliness detection process, records the program audio data onto the hard disk drive 13 and also performs a musical piece determination process of determining whether or not each piece of processing-unit data of the program audio data is musical piece data. Specifically, upon start of the recording of the radio program, the central processing unit 10 starts a musical piece discrimination procedure RT3 as illustrated in FIG. 8 in accordance with the musical piece extraction program previously stored in the ROM 12 or the hard disk drive 13. After starting the musical piece discrimination procedure RT3, the central processing unit 10, at step SP31, initially sets musical piece discrimination information that indicates a result of determination of whether or not each of the pieces of processing-unit data that constitute the program audio data is a part of musical piece data to "Not Music", which indicates that an associated piece of processing-unit data is not a part of musical piece data. Then, the central processing unit 10 proceeds to step SP32.

At step SP32, the central processing unit 10 sends a piece of processing-unit data within the program audio data to the musical piece likeliness detector 37. Note that the sending of the piece of processing-unit data to the musical piece likeliness detector 37 is performed in a sequence according to the broadcast of the radio program. Then, the central processing unit 10 proceeds to step SP33. At step SP33, the central processing unit 10 obtains from the musical piece likeliness detector 37 the musical piece likeliness value of the piece of processing-unit data, i.e., a result of the detection of the musical piece likeliness of the piece of processing-unit data. Then, the central processing unit 10 proceeds to step SP34. At step SP34, the central processing unit 10 compares the obtained musical piece likeliness value with a predetermined threshold value to determine whether or not the musical piece likeliness value is equal to or greater than the threshold value. If the determination at step SP34 is affirmative, which means that the musical piece likeliness value is equal to or greater than the threshold value and that it is likely that the piece of processing-unit data (hereinafter referred to particularly as "musical piece likeliness-detected processing-unit data") of which the musical piece likeliness has been detected at this time be a part of musical piece data, the central processing unit 10 proceeds to step SP35.

At step SP35, the central processing unit 10 determines whether the musical piece discrimination information is set at "Not Music" at the moment. If the determination at step SP35 is affirmative, which means that the musical piece discrimination information is set at "Not Music" at the moment and that it is likely that the musical piece likeliness-detected processing-unit data be data corresponding to a time at which broadcast of a musical piece started in the radio program, the central processing unit 10 proceeds to step SP36. At step SP36, the central processing unit 10 changes the setting of the musical piece discrimination information from "Not Music" to "Music", which indicates that an associated piece of processing-unit data is a part of musical piece data. In addition, the central processing unit 10 records, on the RAM 14 or the hard disk drive 13, the musical piece discrimination information set at "Music" together with time information (i.e., a time code) that indicates a position of the top of the musical piece likeliness-detected processing-unit data in the program audio data (i.e., a position of the boundary between a piece of processing-unit data that has been determined not to be a part of musical piece data and a piece of processing-unit data that has been determined to be a part of musical piece data). Then, the central processing unit 10 proceeds to step SP37. Note that the time information that indicates the position of the top of the musical piece likeliness-detected processing-unit data indicates a time point that precedes the present time by a time required for detecting the musical piece likeliness of the musical piece likeliness-detected processing-unit data, since the radio program is recorded in real time as it is broadcast. At step SP37, the central processing unit 10 determines whether the determination of whether or not the processing-unit data is a part of musical piece data has been performed with respect to all pieces of processing-unit data that constitute the program audio data. If the determination at step SP37 is negative, which means that the recording of the radio program has not been completed yet, the central processing unit 10 returns to step SP32.

If the determination at step SP34 is negative, which means that the musical piece likeliness value is less than the threshold value and that it is not likely that the musical piece likeliness-detected processing-unit data be a part of musical piece data, the central processing unit 10 proceeds to step SP38. At step SP38, the central processing unit 10 determines whether the musical piece discrimination information is set at "Music" at the moment. If the determination at step SP38 is affirmative, which means that the musical piece discrimination information is set at "Music" at the moment and that it is likely that the musical piece likeliness-detected processing-unit data is data corresponding to a time shortly after the broadcast of a musical piece was completed in the radio program, the central processing unit 10 proceeds to step SP39. At step SP39, the central processing unit 10 changes the setting of the musical piece discrimination information from "Music" to "Not Music". In addition, the central processing unit 10 records, on the RAM 14 or the hard disk drive 13, the musical piece discrimination information set at "Not Music" together with time information (i.e., a time code) that indicates a position of the top of the musical piece likeliness-detected processing-unit data in the program audio data (i.e., a position of the boundary between a piece of processing-unit data that has been determined to be a part of musical piece data and a piece of processing-unit data that has been determined not to be a part of musical piece data). Then, the central processing unit 10 proceeds to step SP37.

If the determination at step SP35 is negative, which means that the musical piece discrimination information is set at "Music" at the moment and that it is likely that the musical piece likeliness-detected processing-unit data be data corresponding to a time in the middle of the broadcast of a musical piece in the radio program, the central processing unit 10 returns to step SP32. If the determination at step SP38 is negative, which means that the musical piece discrimination information is set at "Not Music" at the moment and that it is likely that the musical piece likeliness-detected processing-unit data be data corresponding to a time in the middle of broadcast of a musical piece introduction by a disk jockey, a commercial message for advertisement, or the like in the radio program, the central processing unit 10 returns to step SP32.

As described above, while recording the program audio data of the radio program onto the hard disk drive 13, the central processing unit 10 performs the processes of steps SP32 to SP39 as necessary in parallel with the recording. The central processing unit 10 thus determines whether or not each of the pieces of processing-unit data that constitute the program audio data is a part of musical piece data, and records the musical piece discrimination information and the time information (i.e., the time code) that indicate a point of change in the determination. If, thereafter, the determination of step SP37 becomes affirmative, which means that the recording of the radio program has been completed and that the determination of whether or not the processing-unit data is a part of musical piece data has been completed with respect to the entire program audio data, the central processing unit 10 proceeds to step SP40, thereby finishing the musical piece discrimination procedure RT3.

Referring to FIG. 9, when the recording of the radio program has been completed, the central processing unit 10 has completed the recording onto the hard disk drive 13 of program audio data D1 of the radio program that was, for example, designed to start with a theme tune TM of the radio program and thereafter broadcast talks (including introductions of musical pieces) TK1 and TK2 by the disk jockey, musical pieces M1 to Mm, commercial messages CM1 and CM2, and so on in a desired order. Note that the program audio data D1 is composed of musical piece data of the theme tune TM, audio data of the talks TK1 and TK2 by the disk jockey, musical piece data of the musical pieces M1 to Mm, and audio data of the commercial messages CM1 and CM2 arranged in the program audio file in chronological order in which the radio program was broadcast (i.e., in accordance with the schedule of the radio program).

In addition, referring to FIG. 10A, based on the musical piece discrimination information and the time information recorded as a result of the above-described musical piece determination process, the central processing unit 10 identifies, within the program audio data D1, sections (hereinafter referred to as "musical piece candidate sections") MC1 to MCm that are supposed to be candidates for musical piece data. In this case, the central processing unit 10 considers the time information recorded together with the musical piece discrimination information set at "Music" as indicating start times (hereinafter referred to as "section start times") of the musical piece candidate sections MC1 to MCm. In addition, the central processing unit 10 considers the time information recorded together with the musical piece discrimination information set at "Not Music" as indicating end times (hereinafter referred to as "section end times") of the musical piece candidate sections MC1 to MCm.

The central processing unit 10 determines whether data is musical piece data based on the result of the musical piece likeliness detection performed by the musical piece likeliness detector 37 in accordance with the above-described first or second musical piece likeliness detection technique. Therefore, the central processing unit 10 may identify the theme tune TM and the commercial message CM1 that involves background music broadcast in the radio program as the musical piece candidate sections MC1 and MC3, respectively. Moreover, referring to FIG. 10B, in the case where a musical piece M2 (e.g., rap music) that includes a portion composed of spoken words with suppressed instrumental sounds is broadcast during the radio program, the central processing unit 10 may identify, within the program audio data D1, at least two separate musical piece candidate sections MC41 and MC42 within the section of the musical piece data of the musical piece M2. In other words, the central processing unit 10 may identify the section of the musical piece data of the musical piece M2 as the two or more musical piece candidate sections MC41 and MC42 and at least one intervening section NC1 that is supposed not to be a candidate for musical piece data.

Referring to FIG. 11A, in the case where the musical piece candidate sections MC1 to MCm have been identified in a manner as described above with reference to FIG. 10A, for example, the central processing unit 10 generates a data table (hereinafter referred to as a "musical piece candidate section table") MCT1 that indicates the identified musical piece candidate sections MC1 to MCm. In the case where the musical piece candidate sections MC1 to MCm have been identified in a manner as described above with reference to FIG. 10B, for example, the central processing unit 10 generates a musical piece candidate section table MCT2 as illustrated in FIG. 11B. The musical piece candidate section tables MCT1 and MCT2 are each composed of: broadcasting station name information RN indicating the broadcasting station name of the radio station 3 that broadcast the radio program; musical piece candidate section information MC indicating the musical piece candidate sections MC1 to MCm; and section name information AN indicating arbitrarily-assigned section names of the musical piece candidate sections MC1 to MCm.

The central processing unit 10 has previously stored, for example, broadcasting station names RN of the plurality of radio stations 3 and broadcasting frequencies of the radio broadcast waves allocated to the respective radio stations 3 so as to be associated with each other in the hard disk drive 13. Therefore, the central processing unit 10 identifies the broadcasting station name of the radio station 3 that broadcast the recorded radio program based on a broadcasting frequency set in the tuner 19 when recording the radio program. Then, the central processing unit 10 stores the identified broadcasting station name as the broadcasting station name information RN in the musical piece candidate section tables MCT1 and MCT2 so as to be associated with each of the musical piece candidate sections MC1 to MCm. In addition, the central processing unit 10 stores, as the musical piece candidate section information MC in the musical piece candidate section tables MCT1 and MCT2, the airdate of partial data (i.e., the musical piece candidate section data) indicated by each of the musical piece candidate sections MC1 to MCm within the program audio data D1 and the section start time and section end time (i.e., the time information obtained when each of the musical piece candidate sections MC1 to MCm was identified, and expressed in "hour:minute:second" format) of each of the musical piece candidate sections MC1 to MCm. Moreover, the central processing unit 10 stores, as the section name information AN in the musical piece candidate section tables MCT1 and MCT2, section names composed of identification (ID) numbers, consecutive numbers, or the like for identifying each of the musical piece candidate sections MC1 to MCm individually.

After generating the musical piece candidate section table MCT1 or MCT2 as described above, the central processing unit 10 extracts the pieces of musical piece data from the program audio data D1 based on the generated musical piece candidate section table MCT1 or MCT2. At this time, the central processing unit 10 performs a musical piece extraction process according to a musical piece extraction technique, for example, selected by the user from two types of musical piece extraction techniques (i.e., first and second musical piece extraction techniques). Of the two types of musical piece extraction techniques, the first musical piece extraction technique uses the broadcast musical piece table OAT delivered from the radio broadcast information distribution server 4 as described above with reference to FIGS. 2 and 3 as well as the musical piece candidate section table MCT1 or MCT2. Meanwhile, the second musical piece extraction technique uses the presentation-use musical piece information provided by the musical piece information search server 5 as described above with reference to FIG. 2 as well as the musical piece candidate section table MCT1 or MCT2. The musical piece extraction process in accordance with the two types of musical piece extraction techniques will now be described below one after the other.

First, in the case where the first musical piece extraction technique is selected by the user, the central processing unit 10, after generating the musical piece candidate section table MCT1 or MCT2, requests via the communication processing section 16 the radio broadcast information distribution server 4 managed by the radio station 3 that broadcast the recorded radio program to transmit the broadcast musical piece table OAT corresponding to the radio program. If the radio broadcast information distribution server 4 accordingly transmits the broadcast musical piece table OAT, the central processing unit 10 receives the broadcast musical piece table OAT via the communication processing section 16. Then, by comparing the broadcast date/time information OTI1 within the broadcast musical piece table OAT with the musical piece candidate section information MC within the musical piece candidate section table MCT1 or MCT2, the central processing unit 10 identifies, from among the musical piece candidate sections MC1 to MCm within the program audio data D1, the musical piece candidate sections MC2, MC4, and MCm as corresponding to the musical piece data of the musical pieces broadcast in the radio program. As a result, the central processing unit 10 determines the identified musical piece candidate sections MC2, MC4, and MCm to be sections (hereinafter referred to particularly as "musical piece sections") of the musical piece data in the program audio data D1. Note that even in the case where, as described above with reference to FIGS. 10B and 11B, a section of the program audio data D1 that corresponds to a single integral piece of musical piece data was identified as the two or more separate musical piece candidate sections MC41 and MC42 and the intervening section NC1, the central processing unit 10 is able to integrate the two or more musical piece candidate sections MC41 and MC42 and the intervening section NC1 together into a single section and determine the resultant single section to be a single musical piece section (which corresponds to the musical piece candidate section MC4) by comparing the broadcast date/time information OTI1 in the broadcast musical piece table OAT with the musical piece candidate section information MC in the musical piece candidate section table MCT2.

Then, as illustrated in FIG. 12, the central processing unit 10 substitutes, as a new broadcast start time and a new broadcast end time, the section start time and section end time within each piece of musical piece candidate section information MC indicating the musical piece section for the corresponding piece of broadcast date/time information OTI1 in the broadcast musical piece table OAT. In other words, the central processing unit 10 replaces the original broadcast start time and broadcast end time within each piece of broadcast date/time information OTI1 with the new broadcast start time (i.e., the section start time) and the broadcast end time (i.e., the section end time), which are expressed in more detailed units. In this manner, based on the broadcast musical piece table OAT, the central processing unit 10 generates a time-corrected broadcast musical piece table ROAT that includes pieces of broadcast date/time information OTI2 in which only the broadcast start times and broadcast end times of the musical pieces have been corrected.

Then, based on the broadcast date/time information OTI2 within the time-corrected broadcast musical piece table ROAT, the central processing unit 10 cuts out and thus extracts the musical piece section as the musical piece data from the program audio data D1 recorded on the hard disk drive 13, and records the extracted musical piece data on the hard disk drive 13. In addition, the central processing unit 10 records the musical piece title MT, the artist name ARN, and the genre name JN within the time-corrected broadcast musical piece table ROAT as the associated musical piece information (which is, in this case, a part of the broadcast musical piece information OAM1 to OAMn) on the hard disk drive 13 so as to be associated with the extracted musical piece data (i.e., the cut-out musical piece section). At this time, the central processing unit 10, for example, inquires of the user whether the original program audio data D1 should be deleted. If the deletion of the program audio data D1 is requested, the central processing unit 10 deletes the program audio data D1 from the hard disk drive 13. Meanwhile, if the user requests that the program audio data D1 should not be deleted, the central processing unit 10 keeps the program audio data D1 recorded on the hard disk drive 13. In the case where the central processing unit 10 records the musical piece data extracted from the program audio data D1 on the hard disk drive 13 and then deletes the program audio data D1 from the hard disk drive 13, it is possible to prevent a recording-use free space of the hard disk drive 13 from being wasted. In the case where the program audio data D1 is not deleted, the central processing unit 10 is able to reproduce not only the musical piece data but also the program audio data D1 for the user to listen to the radio program.

Figure 13:
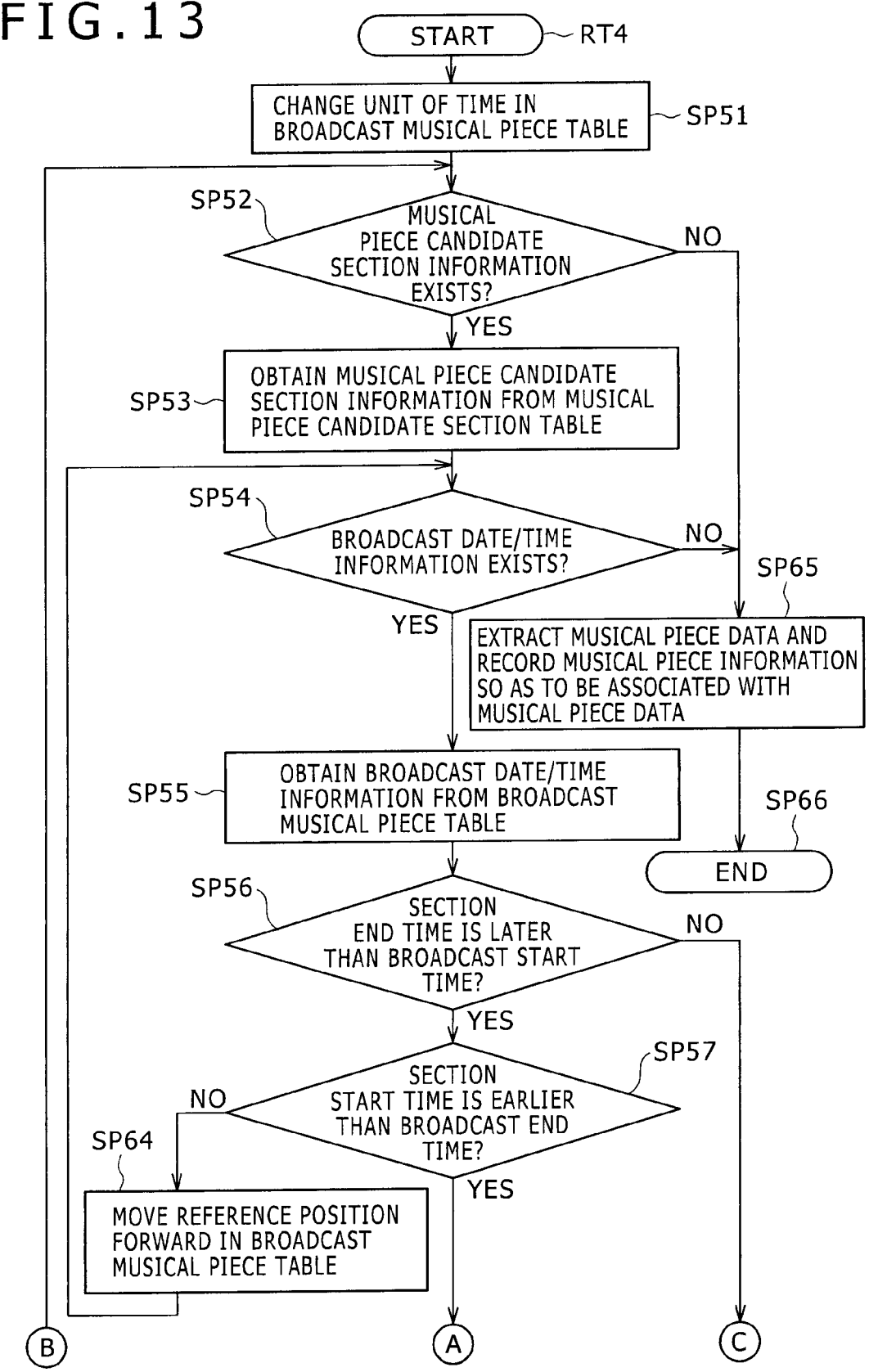
FIG. 13 is a flowchart illustrating a musical piece extraction procedure (1)
Figure 14:
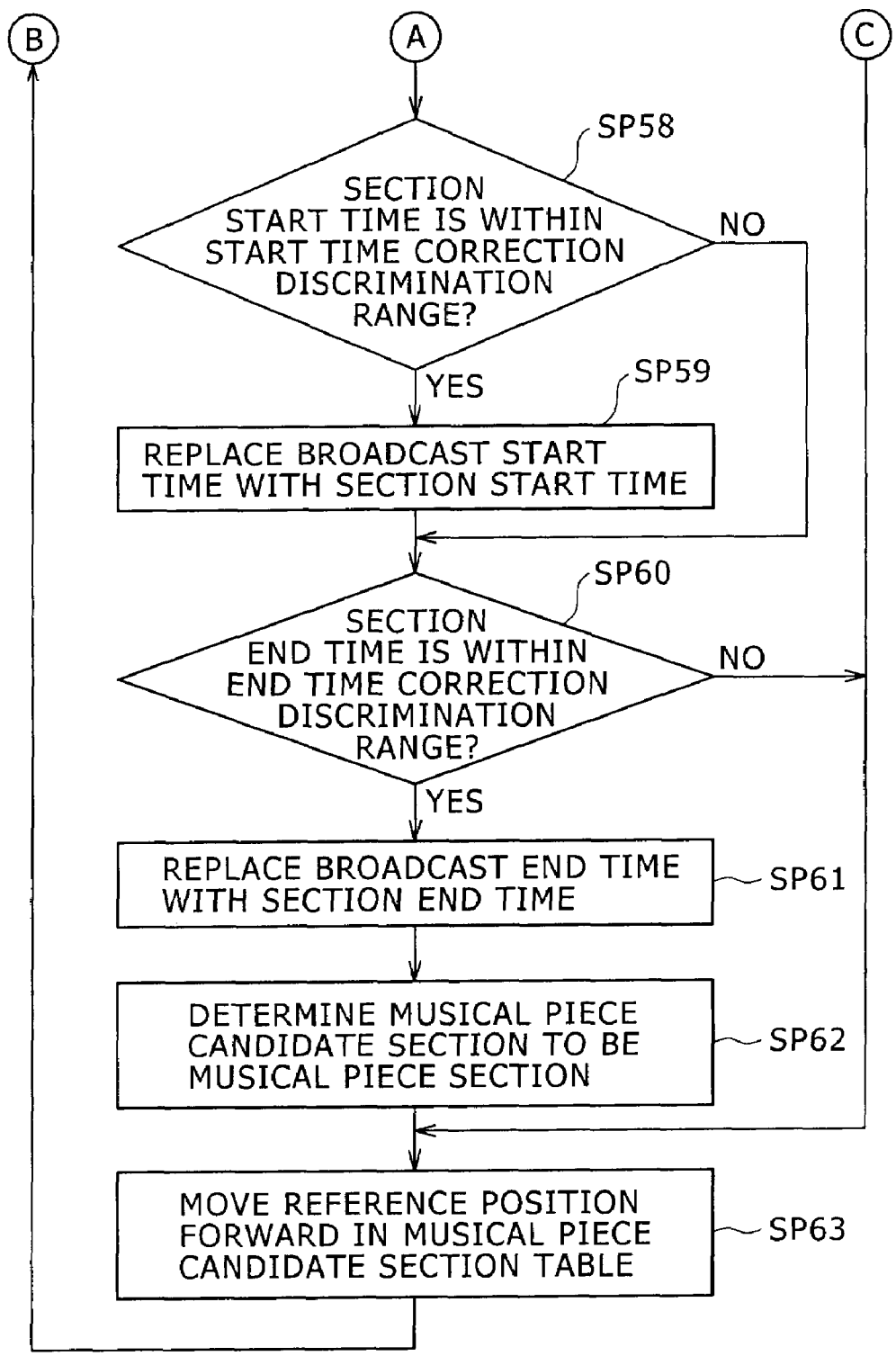
FIG. 14 is a flowchart illustrating a musical piece extraction procedure (2)

In practice, the central processing unit 10 performs the musical piece extraction process according to the first musical piece extraction technique in accordance with the musical piece extraction program. That is, after generating the musical piece candidate section table MCT1 or MCT2, the central processing unit 10 starts a musical piece extraction procedure RT4 as illustrated in FIGS. 13 and 14 in accordance with the musical piece extraction program. After starting the musical piece extraction procedure RT4, the central processing unit 10 acquires the broadcast musical piece table OAT from the radio broadcast information distribution server 4 at step SP51. Then, the central processing unit 10 changes the unit (i.e., minutes) of the broadcast start time and the broadcast end time within the broadcast musical piece table OAT so as to become in accord with the unit (i.e., seconds) of the section start time and the section end time within the musical piece candidate section table MCT1 or MCT2. The central processing unit 10 also initializes a reference position for the musical piece candidate section information MC in the musical piece candidate section table MCT1 or MCT2. Specifically, the central processing unit 10 sets the reference position for the musical piece candidate section information MC at the earliest (in terms of time) piece of musical piece candidate section information MC (i.e., the musical piece candidate section information MC of the topmost musical piece candidate section data in the program audio data D1). Further, the central processing unit 10 initializes a reference position for the broadcast date/time information OTI1 in the broadcast musical piece table OAT. Specifically, the central processing unit 10 sets the reference position for the broadcast date/time information OTI1 at the earliest (in terms of time) piece of broadcast date/time information OTI1 (i.e., the broadcast date/time information OTI1 of the musical piece that was broadcast earlier than any other musical piece in the radio program). Then, the central processing unit 10 proceeds to step SP52.

At step SP52, the central processing unit 10 determines whether there exists, at the reference position within the musical piece candidate section table MCT1 or MCT2, a piece of musical piece candidate section information MC to be referred to. If the determination at step SP52 is affirmative, which means that reference to all pieces of musical piece candidate section information MC within the musical piece candidate section table MCT1 or MCT2 has not been completed yet and that there exists, at the reference position within the musical piece candidate section table MCT1 or MCT2, a piece of musical piece candidate section information MC, the central processing unit 10 proceeds to step SP53. At step SP53, the central processing unit 10 obtains the piece of musical piece candidate section information MC at the reference position from the musical piece candidate section table MCT1 or MCT2. Then, the central processing unit 10 proceeds to step SP54.

At step SP54, the central processing unit 10 determines whether there exists, at the reference position within the broadcast musical piece table OAT, a piece of broadcast date/time information OTI1 to be referred to. If the determination at step SP54 is affirmative, which means that reference to all pieces of broadcast date/time information OTI1 within the broadcast musical piece table OAT has not been completed yet and that there exists, at the reference position within the broadcast musical piece table OAT, a piece of broadcast date/time information OTI1, the central processing unit 10 proceeds to step SP55. At step SP55, the central processing unit 10 obtains the piece of broadcast date/time information OTI1 at the reference position from the broadcast musical piece table OAT. Then, the central processing unit 10 proceeds to step SP56.

At step SP56, the central processing unit 10 determines whether the section end time within the piece of musical piece candidate section information MC that is currently referred to is later, in terms of time, than the broadcast start time within the piece of broadcast date/time information OTI1 that is currently referred to. If the determination at step SP56 is affirmative, which means that a part or the whole of the musical piece candidate section MC2 to MCm indicated by the musical piece candidate section information MC may overlap, in terms of time, a part or the whole of a section (hereinafter referred to as a "musical piece broadcast estimated section") between the broadcast start time and the broadcast end time within the broadcast date/time information OTI1, the central processing unit 10 proceeds to step SP57. At step SP57, the central processing unit 10 determines whether the section start time within the piece of musical piece candidate section information MC that is currently referred to is earlier, in terms of time, than the broadcast end time within the piece of broadcast date/time information OTI1 that is currently referred to. If the determination at step SP57 is affirmative, which means that a part or the whole of the musical piece candidate section MC2, MC4, MC41, MC42, or MCm indicated by the musical piece candidate section information MC may overlap, in terms of time, a part or the whole of the musical piece broadcast estimated section indicated by the broadcast date/time information OTI1, the central processing unit 10 proceeds to step SP58.

At step SP58, the central processing unit 10 determines whether the section start time within the piece of musical piece candidate section information MC that is currently referred to falls within a start time correction discrimination range. The start time correction discrimination range is a range of several minutes (e.g., two minutes) whose center is the broadcast start time within the piece of broadcast date/time information OTI1 that is currently referred to. If the determination at step SP58 is affirmative, which means that at least the top end of the musical piece candidate section MC2, MC4, MC41, or MCm indicated by the musical piece candidate section information MC coincides in terms of time, significantly or completely, with the top end of the musical piece broadcast estimated section indicated by the broadcast date/time information OTI1, the central processing unit 10 proceeds to step SP59. At step SP59, the central processing unit 10 replaces the broadcast start time within the piece of broadcast date/time information OTI1 that is currently referred to with the new broadcast start time, i.e., section start information within the piece of musical piece candidate section information MC that is currently referred to. Then, the central processing unit 10 proceeds to step SP60.

At step SP60, the central processing unit 10 determines whether the section end time within the piece of musical piece candidate section information MC that is currently referred to falls within an end time correction discrimination range. The end time correction discrimination range is a range of several minutes (e.g., two minutes) whose center is the broadcast end time within the piece of broadcast date/time information OTI1 that is currently referred to. If the determination at step SP60 is affirmative, which means that at least the rear end of the musical piece candidate section MC2, MC4, MC42, or MCm indicated by the musical piece candidate section information MC coincides in terms of time, significantly or completely, with the rear end of the musical piece broadcast estimated section indicated by the broadcast date/time information OTI1, the central processing unit 10 proceeds to step SP61. Then, at step SP61, the central processing unit 10 replaces the broadcast end time within the piece of broadcast date/time information OTI1 that is currently referred to with the new broadcast end time, i.e., section end information within the piece of musical piece candidate section information MC that is currently referred to. Then, the central processing unit 10 proceeds to step SP62.

If the determination at the above-described step SP58 is negative, this means that the musical piece candidate section MC42 indicated by the musical piece candidate section information MC is one of a plurality of musical piece candidate sections MC41 and MC42 that correspond to the musical piece broadcast estimated section indicated by the broadcast date/time information OTI1. In other words, it means that although a part or the whole of the musical piece candidate section MC42 overlaps, in terms of time, the musical piece broadcast estimated section, the top end of the musical piece candidate section MC42 is too distant, in terms of time, from the top end of the musical piece broadcast estimated section to regard the two top ends as coinciding with each other. Accordingly, in this case, the central processing unit 10, skipping step SP59, proceeds to step SP60. If the determination at the above-described step SP60 is negative, this means that the musical piece candidate section MC41 indicated by the musical piece candidate section information MC is one of the plurality of musical piece candidate sections MC41 and MC42 that correspond to the musical piece broadcast estimated section indicated by the broadcast date/time information OTI1. In other words, it means that although a part or the whole of the musical piece candidate section MC41 overlaps, in terms of time, the musical piece broadcast estimated section, the rear end of the musical piece candidate section MC41 is too distant, in terms of time, from the rear end of the musical piece broadcast estimated section to regard the two rear ends as coinciding with each other. Accordingly, in this case, the central processing unit 10, skipping the processes of steps SP61 and SP62, proceeds to step SP63.

Thus, at step SP62, the central processing unit 10 determines a section between the section start time and the section end time within the one or two pieces of musical piece candidate section information MC that have displaced the broadcast start time and the broadcast end time, respectively, within the broadcast date/time information OTI1 to be the musical piece section. Then, the central processing unit 10 proceeds to step SP63. That is, in the case where the section start time and the section end time within a single piece of musical piece candidate section information MC have displaced the broadcast start time and the broadcast end time, respectively, within the broadcast date/time information OTI1, the central processing unit 10 determines the musical piece candidate section MC2, MC4, or MCm indicated by the single piece of musical piece candidate section information MC to be the musical piece section. Meanwhile, in the case where the section start time and the section end time within two pieces of musical piece candidate section information MC have displaced the broadcast start time and the broadcast end time, respectively, within the broadcast date/time information OTI1, the central processing unit 10, while integrating the two or more musical piece candidate sections MC41 and MC42 that correspond to a single musical piece broadcast estimated section with the intervening section NC1 intervening therebetween, determines the section between the section start time and the section end time to be the musical piece section.

Then, at step SP63, the central processing unit 10 moves the reference position within the musical piece candidate section table MCT1 or MCT2 forward from the piece of musical piece candidate section information MC that is referred to at the moment to the next (in terms of time) piece of musical piece candidate section information MC. Then, the central processing unit 10 returns to step SP52. If the determination at the above-described step SP56 is negative, which means that the musical piece candidate section MC1 or MC3 indicated by the musical piece candidate section information MC is placed, in terms of time, before the musical piece broadcast estimated section indicated by the broadcast date/time information OTI1 and does not in the least overlap the musical piece broadcast estimated section, the central processing unit 10 proceeds to step SP63. If the determination at the above-described step SP57 is negative, which means that the musical piece candidate section MC2 or MCm indicated by the musical piece candidate section information MC is placed, in terms of time, after the musical piece broadcast estimated section indicated by the broadcast date/time information OTI1 and does not in the least overlap the musical piece broadcast estimated section, the central processing unit 10 proceeds to step SP64. Then, at step SP64, the central processing unit 10 moves the reference position within the broadcast musical piece table OAT forward from the piece of broadcast date/time information OTI1 that is referred to at the moment to the next (in terms of time) piece of broadcast date/time information OTI1. Then, the central processing unit 10 returns to step SP54. Thereafter, the central processing unit 10 repeats the processes of steps SP52 to SP64 cyclically until the determination at step SP52 or step SP54 becomes negative. In the above-described manner, the central processing unit 10 determines, out of the musical piece candidate sections MC1 to MCm indicated by the plurality of pieces of musical piece candidate section information MC within the musical piece candidate section table MCT1 or MCT2, the musical piece candidate sections MC2, MC4, and MCm that correspond to the musical piece broadcast estimated sections indicated by the broadcast date/time information OTI1 within the broadcast musical piece table OAT to be the musical piece sections.

If the determination at the above-described step SP52 is negative, which means that reference to all pieces of musical piece candidate section information MC within the musical piece candidate section table MCT1 or MCT2 has been completed, the central processing unit 10 proceeds to step SP65. If the determination at the above-described step SP54 is negative, which means that reference to all pieces of broadcast date/time information OTI1 within the broadcast musical piece table OAT has been completed, the central processing unit 10 proceeds to step SP65. At step SP65, based on the broadcast date/time information OTI2 within the time-corrected broadcast musical piece table ROAT generated in accordance with the determined musical piece sections, the central processing unit 10 extracts the musical piece sections as the musical piece data from the program audio data D1 recorded on the hard disk drive 13, and also records the musical piece title MT, the artist name ARN, and the genre name JN within the time-corrected broadcast musical piece table ROAT as the associated musical piece information on the hard disk drive 13 so as to be associated with the extracted musical piece data. Then, central processing unit 10 proceeds to step SP66. At step SP66, the central processing unit 10 finishes the musical piece extraction procedure RT4 in accordance with the first musical piece extraction technique.

In the case where the second musical piece extraction technique is selected, the central processing unit 10, after generating the musical piece candidate section table MCT1 or MCT2, controls the data analysis circuit 35 in the data processing section 17 so that the data analysis circuit 35 uses the input switch 36 and the output switch 39 to connect both the input terminal and the output terminal of the musical piece fingerprint generator 38 to the bus 11. Then, in accordance with the musical piece candidate section information MC within the musical piece candidate section table MCT1 or MCT2, the central processing unit 10 reads from the hard disk drive 13 the pieces of musical piece candidate section data within the program audio data D1, and supplies the pieces of musical piece candidate section data to the data analysis circuit 35. Then, the data analysis circuit 35 allows the musical piece fingerprint generator 38 to take in the pieces of musical piece candidate section data supplied by the central processing unit 10 via the input switch 36. Then, the musical piece fingerprint generator 38 analyzes, for example, the analog audio waveforms of the pieces of musical piece candidate section data and, based on the analysis, generates the pieces of apparatus-presented musical piece fingerprint information for identifying the pieces of musical piece candidate section data individually. Then, the musical piece fingerprint generator 38 sends the pieces of apparatus-presented musical piece fingerprint information to the central processing unit 10 via the output switch 39.

Upon receipt of the apparatus-presented musical piece fingerprint information from the fingerprint generator 38, the central processing unit 10 transmits, together with the apparatus-presented musical piece fingerprint information, a request to search for the presentation-use musical piece information to the musical piece information search server 5 via the communication processing section 16. As a result, the musical piece information search server 5 transmits the presentation-use musical piece information retrieved based on the apparatus-presented musical piece fingerprint information, and the central processing unit 10 receives the presentation-use musical piece information via the communication processing section 16. Then, as illustrated in FIGS. 15A and 15B, the central processing unit 10 adds, to the musical piece candidate section table MCT1, pieces of presentation-use musical piece information so as to be associated with the corresponding pieces of musical piece candidate section information MC, thereby determining the musical piece candidate sections MC1, MC2, MC4, and MCm indicated by the pieces of musical piece candidate section information MC to be the musical piece sections. Note that the central processing unit 10 determines even the musical piece candidate section MC1 corresponding to the theme tune TM in the radio program to be the musical piece section, if the presentation-use musical piece information therefor can be acquired and associated with the musical piece candidate section MC1. On the other hand, even if the central processing unit 10 generates a piece of apparatus-presented musical piece fingerprint information based on the musical piece candidate section data of the musical piece candidate section MC3 corresponding to the commercial message in the radio program composed of a narrator's voice, etc., accompanied by the background music, and requests the musical piece information search server 5 to search for a corresponding piece of presentation-use musical piece information, the central processing unit 10 may not acquire the corresponding piece of presentation-use musical piece information from the musical piece information search server 5. In this case, the central processing unit 10 neither determines the musical piece candidate section MC3 to be the musical piece section nor associates any presentation-use musical piece information with the piece of musical piece candidate section information MC corresponding to the musical piece candidate section MC3.

In the above-described manner, the central processing unit 10 generates, based on the musical piece candidate section table MCT1, a musical piece extraction table MET composed of the musical piece candidate section table MCT1 and the presentation-use musical piece information added thereto. Note that in the case where different pieces of presentation-use musical piece information are associated with neighboring (in terms of time) pieces of musical piece candidate section information MC, the central processing unit 10 simply adds the pieces of presentation-use musical piece information to the musical piece candidate section table MCT1 to generate the musical piece extraction table MET (see FIG. 15A). On the other hand, in the case where, as described above with reference to FIGS. 10B and 11B, the same piece of presentation-use musical piece information is associated with neighboring (in terms of time) pieces of musical piece candidate section information MC (see FIG. 15B) because the essentially single musical piece data section within the program audio data D1 has been identified as the two or more distinct musical piece candidate sections MC41 and MC42 and the intervening section NC1, the central processing unit 10 determines the musical piece candidate sections MC41 and MC42 indicated by the neighboring pieces of musical piece candidate section information MC and the intervening section NC1 integrated together to be a single musical piece section (which corresponds to the musical piece candidate section MC4) to generate the musical piece extraction table MET (FIG. 15A).

Accordingly, based on the musical piece candidate section information MC within the musical piece extraction table MET, the central processing unit 10 cuts out and thus extracts the musical piece sections MC1, MC2, MC4, and MCm as the musical piece data from the program audio data D1 recorded on the hard disk drive 13, and records the extracted musical piece data on the hard disk drive 13. In addition, the central processing unit 10 records, as the associated musical piece information (which is, in this case, the presentation-use musical piece information), the musical piece titles MT, the artist names ARN, and the genre names JN within the musical piece extraction table MET on the hard disk drive 13 so as to be associated with the extracted musical piece data (i.e., the cut-out musical piece sections MC1, MC2, MC4, and MCm). Note that at this time also, the central processing unit 10 inquires of the user whether the original program audio data D1 should be deleted and, in accordance with the response to the inquiry, does or does not delete the program audio data D1 from the hard disk drive 13.

Figure 16:
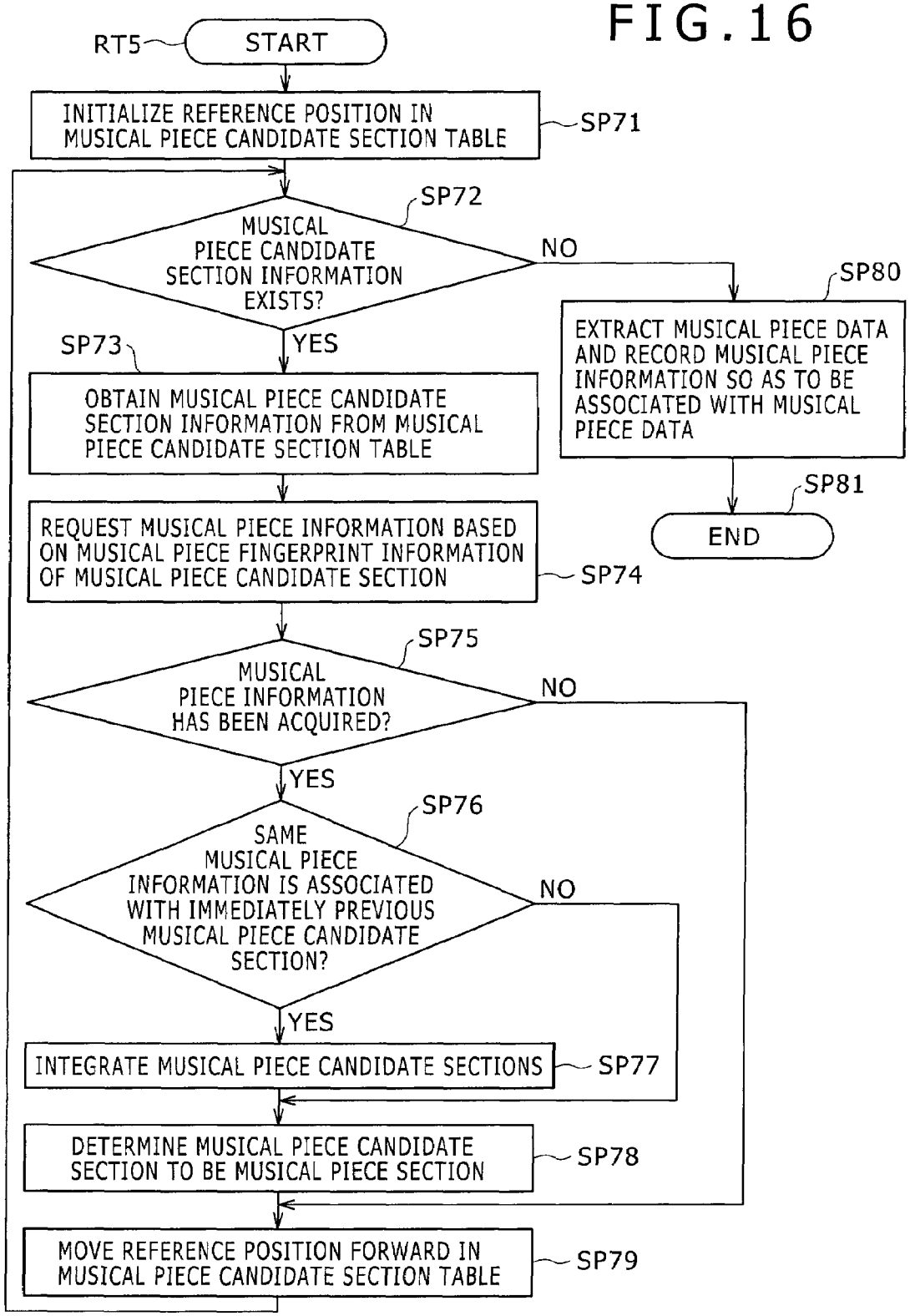
FIG. 16 is a flowchart illustrating a musical piece extraction procedure.

In practice, the central processing unit 10 performs the musical piece extraction process according to the second musical piece extraction technique in accordance with the musical piece extraction program. Specifically, after generating the musical piece candidate section table MCT1 or MCT2, the central processing unit 10 starts a musical piece extraction procedure RT5 as illustrated in FIG. 16 in accordance with the musical piece extraction program. After starting the musical piece extraction procedure RT5, the central processing unit 10, at step SP71, initializes the reference position for the musical piece candidate section information MC in the musical piece candidate section table MCT1 or MCT2 in a manner similar to that described above. Then, the central processing unit 10 proceeds to step SP72.

At step SP72, the central processing unit 10 determines whether there exists, at the reference position in the musical piece candidate section table MCT1 or MCT2, a piece of musical piece candidate section information MC to be referred to. If the determination at step SP72 is affirmative, which means that reference to all pieces of musical piece candidate section information MC in the musical piece candidate section table MCT1 or MCT2 has not been completed yet and that there exists a piece of musical piece candidate section information MC at the reference position in the musical piece candidate section table MCT1 or MCT2, the central processing unit 10 proceeds to step SP73. At step SP73, the central processing unit 10 obtains, from the musical piece candidate section table MCT1 or MCT2, the piece of musical piece candidate section information MC at the reference position. Then, the central processing unit 10 proceeds to step SP74.

At step SP74, based on the piece of musical piece candidate section information MC, the central processing unit 10 reads the corresponding piece of musical piece candidate section data within the program audio data D1 from the hard disk drive 13, and, sending at least a part of the musical piece candidate section data to the musical piece fingerprint generator 38, generates the apparatus-presented musical piece fingerprint information therefor. Then, using the apparatus-presented musical piece fingerprint information, the central processing unit 10 requests the musical piece information search server 5 to transmit the presentation-use musical piece information, and proceeds to step SP75. At step SP75, the central processing unit 10 determines whether the presentation-use musical piece information has been acquired from the musical piece information search server 5. If the determination at step SP75 is affirmative, which means that the musical piece candidate section MC1, MC2, MC4, or MCm indicated by the musical piece candidate section information MC corresponds to some musical piece data within the program audio data D1 and that the presentation-use musical piece information therefor has been acquired and associated with the musical piece candidate section information MC, the central processing unit 10 proceeds to step SP76.

At step SP76, the central processing unit 10 determines whether the same presentation-use musical piece information acquired at this time is also associated with the musical piece candidate section information MC that indicates the musical piece candidate section MC1, MC2, MC4, MC41, MC42, or MCm that is immediately previous (in terms of time) to the musical piece candidate section MC1, MC2, MC4, MC41, MC42, or MCm indicated by the musical piece candidate section information MC that is referred to at the moment. If the determination at step SP76 is affirmative, which means that the musical piece candidate section MC42 indicated by the musical piece candidate section information MC that is referred to at the moment is one of a plurality of musical piece candidate sections MC41 and MC42 that correspond to a single integral piece of musical piece data within the program audio data D1 and that the presentation-use musical piece information associated with the musical piece candidate section information MC that is referred to at the moment is the same as the presentation-use musical piece information that is associated with the musical piece candidate section information MC that indicates the immediately previous (in terms of time) musical piece candidate section MC41, the central processing unit 10 proceeds to step SP77.

At step SP77, using only the section start time within the musical piece candidate section information MC that indicates the immediately previous musical piece candidate section MC41 and the section end time within the musical piece candidate section information MC that is referred to at the moment, the central processing unit 10 generates musical piece candidate section information MC that indicates the new musical piece candidate section MC4 composed of the musical piece candidate sections MC41 and MC42 and the intervening section NC1 integrated together, and newly associate the presentation-use musical piece information acquired at this time with the newly-generated musical piece candidate section information MC. Then, the central processing unit 10 proceeds to step SP78. At step SP78, the central processing unit 10 determines the musical piece candidate section MC1, MC2, MC4, or MCm indicated by the musical piece candidate section information MC with which the presentation-use musical piece information is associated to be the musical piece section, and proceeds to step SP79. At step SP79, the central processing unit 10 moves the reference position in the musical piece candidate section table MCT1 or MCT2 forward from the musical piece candidate section information MC that is referred to at the moment to the next (in terms of time) musical piece candidate section information MC, and returns to step SP72. If the determination at the above-described step SP75 is negative, which means that the musical piece candidate section MC3 indicated by the musical piece candidate section information MC does not correspond to any musical piece data in the program audio data D1 and that, therefore, the presentation-use musical piece information has not been acquired therefor, the central processing unit 10 proceeds to step SP79. If the determination at the above-described step SP76 is negative, which means that the musical piece candidate section MC1, MC2, MC4, or MCm indicated by the musical piece candidate section information MC that is referred to at the moment is only the musical piece candidate section MC1, MC2, MC4, or MCm that corresponds to a single integral piece of musical piece data within the program audio data D1, the central processing unit 10 proceeds to step SP78.

Thereafter, the central processing unit 10 repeats the processes of steps SP72 to SP79 cyclically until the determination at step SP72 becomes negative. In the above-described manner, the central processing unit 10 associates, with the plurality of pieces of musical piece candidate section information MC within the musical piece candidate section table MCT1 or MCT2, the corresponding pieces of presentation-use musical piece information, which indicate that the musical piece candidate sections MC1, MC2, MC4, and MCm, respectively, are the musical piece data, and determines the musical piece candidate sections MC1, MC2, MC4, and MCm to be the musical piece sections. If the determination at the above-described step SP72 is negative, which means that reference to all pieces of musical piece candidate section information MC within the musical piece candidate section table MCT1 or MCT2 has been completed, the central processing unit 10 proceeds to step SP80. At step SP80, based on the pieces of musical piece candidate section information MC within the musical piece extraction table MET generated in accordance with the determined musical piece sections, the central processing unit 10 extracts, from the program audio data D1 within the hard disk drive 13, the musical piece sections as the musical piece data, and also records, as the associated musical piece information, the musical piece titles MT, the artist names ARN, and the genre names JN within the musical piece extraction table MET on the hard disk drive 13 so as to be associated with the extracted musical piece data. Then, the central processing unit 10 proceeds to step SP81. At step SP81, the central processing unit 10 finishes the musical piece extraction procedure RT5 according to the second musical piece extraction technique.

Suppose that the first musical piece extraction technique is selected by the user and that when the central processing unit 10 accesses the radio broadcast information distribution server 4 to acquire the broadcast musical piece table OAT therefrom, the central processing unit 10 fails to acquire the broadcast musical piece table OAT because, for example, the maintenance of the radio broadcast information distribution server 4 is being carried out at the time. In this case, the central processing unit 10 automatically switches to the second musical piece extraction technique and performs the musical piece extraction process in accordance with the second musical piece extraction technique. Also suppose that the second musical piece extraction technique is selected by the user and that when the central processing unit 10 accesses the musical piece information search server 5 to acquire the presentation-use musical piece information, the central processing unit 10 fails to acquire the presentation-use musical piece information because, for example, the maintenance of the musical piece information search server 5 is being carried out at the time. In this case, the central processing unit 10 automatically switches to the first musical piece extraction technique, and performs the musical piece extraction process in accordance with the first musical piece extraction technique. Thus, when the extraction of the musical piece(s) is requested by the user, the central processing unit 10 is able to extract the musical piece(s) almost without fail.

In the case where the time-corrected broadcast musical piece table ROAT or the musical piece extraction table MET has been generated by the musical piece extraction process, the central processing unit 10 is capable of, based on the time-corrected broadcast musical piece table ROAT or the musical piece extraction table MET, associating recording position information indicative of a recording position in the hard disk drive 13 of each of the pieces of musical piece data extracted from the program audio data D1 with the corresponding piece of associated musical piece information composed of the musical piece title MT, the artist name ARN, and the genre name JN to generate a playlist (not shown) that specifies an order in which the pieces of musical piece data are reproduced. Then, if the user issues, via the operation key 15, a request to reproduce the pieces of musical piece data according to the playlist, the central processing unit 10 reads the pieces of musical piece data extracted from the program audio data D1 sequentially from the hard disk drive 13 according to the playlist, and subjects the pieces of musical piece data sequentially to a reproduction process in the data processing section 17, whereby the user is able to listen to only the musical piece sections of the radio program in succession.

A musical piece is sometimes broadcast in the radio program with the top or rear end thereof overlapped by the disk jockey's introductory explanation of the musical piece, or forcibly faded out in the middle of the musical piece. In other words, the musical piece is sometimes broadcast in its incomplete form. Further, the sound quality of the musical piece broadcast in the radio program may be deteriorated depending on the broadcasting system (i.e., a frequency modulation, an amplitude modulation, or the like) of the radio broadcast wave adopted by the radio station 3. As such, if the user issues a request to purchase musical piece data while the musical piece data is being reproduced, the central processing unit 10 is able to acquire (i.e., download), from the musical piece distribution server 6, the same musical piece data as the musical piece data that is currently reproduced. Then, when the musical piece data is acquired from the musical piece distribution server 6, the central processing unit 10 records the acquired musical piece data on the hard disk drive 13 and makes the same musical piece data extracted from the program audio data D1 irreproducible by, for example, deleting it from the hard disk drive 13. In this manner, the central processing unit 10 is capable of replacing the musical piece data extracted from the program audio data D1 with the musical piece data of the complete musical piece with undeteriorated sound quality.

Figure 17:
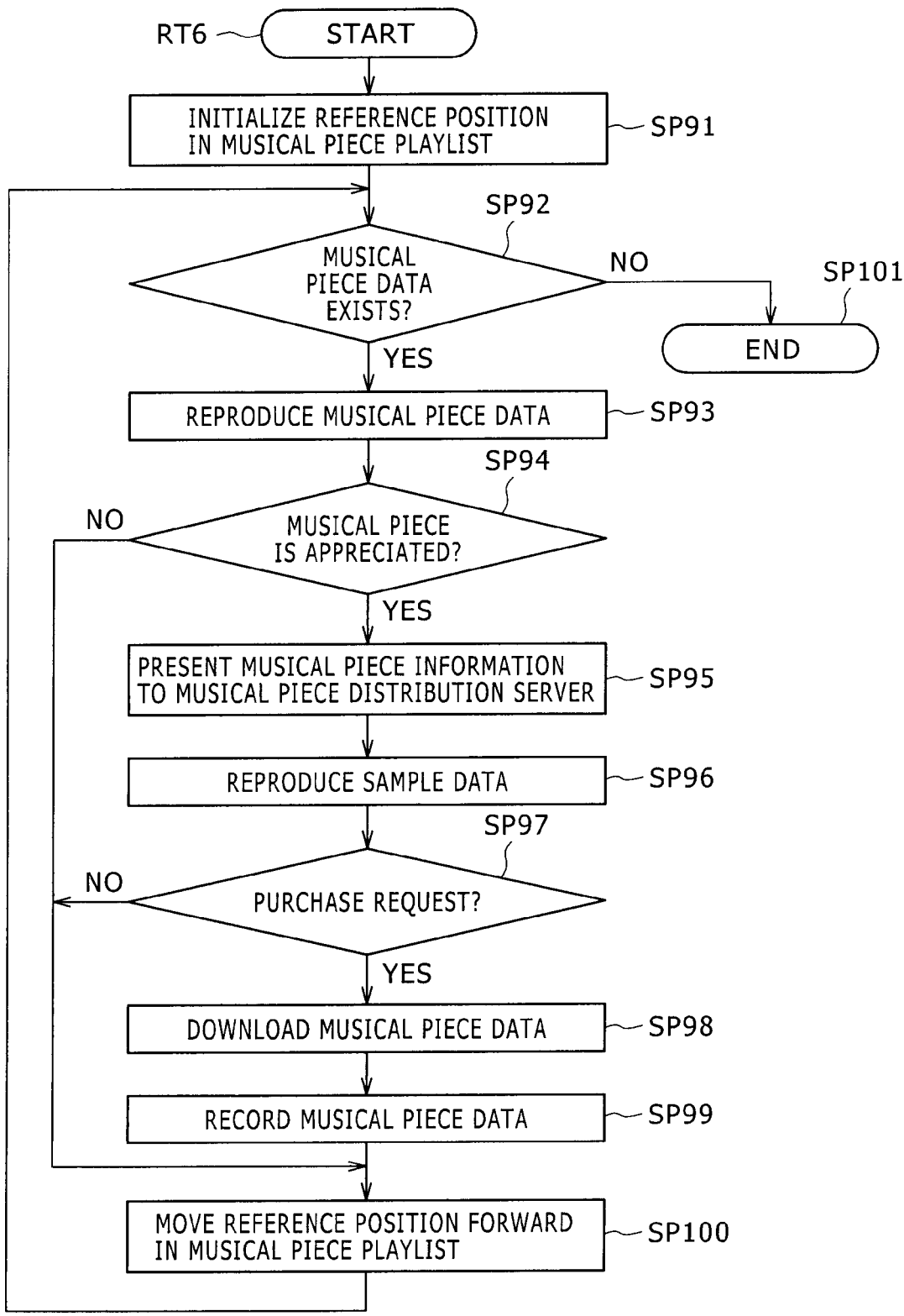
FIG. 17 is a flowchart illustrating a musical piece purchase procedure.

In practice, the central processing unit 10 performs such a musical piece purchase process in accordance with the musical piece extraction program. That is, when the user issues a request to reproduce the pieces of musical piece data according to the playlist, the central processing unit 10 starts a musical piece purchase procedure RT6 as illustrated in FIG. 17 in accordance with the musical piece extraction program. After starting the musical piece purchase procedure RT6, the central processing unit 10 initializes a reference position in the playlist at step SP91 so that the reference position in the playlist accords with the recording position information and associated musical piece information (hereinafter referred to collectively as an "item") of the musical piece data that is the first to be reproduced according to the order of reproduction. Then, the central processing unit 10 proceeds to step SP92. At step SP92, the central processing unit 10 determines whether there exists any musical piece data that should be reproduced according to the playlist but has not been reproduced yet. If the determination at step SP92 is affirmative, which means that the reproduction of all pieces of musical piece data that should be reproduced according to the playlist has not been completed yet and that the user has not forcibly terminated the reproduction thereof, the central processing unit 10 proceeds to step SP93. At step SP93, in accordance with the item that is currently referred to in the playlist, the central processing unit 10 reads the musical piece data from the hard disk drive 13 and subjects the read musical piece data to the reproduction process in the data processing section 17. Then, the central processing unit 10 proceeds to step SP94.

At step SP94, the central processing unit 10 inquires of the user whether the user appreciates the musical piece based on the musical piece data that is currently reproduced. If it is notified by the user via the operation key 15 that the user appreciates the musical piece, the central processing unit 10 proceeds to step SP95. At step SP95, the central processing unit 10 presents, to the musical piece distribution server 6, the associated musical piece information contained in the item that is currently referred to, and proceeds to step SP96. At step SP96, the central processing unit 10 receives sample data corresponding to the associated musical piece information transmitted from the musical piece distribution server 6 in streaming format, and subjects the received sample data to the reproduction process in the data processing section 17 for the user to check the musical piece corresponding to the associated musical piece information. Then, the central processing unit 10 proceeds to step SP97. Note that in the case where the sample data is received from the musical piece distribution server 6 when the reading of the musical piece data from the hard disk drive 13 and the reproduction of the musical piece data are in progress, the central processing unit 10 may terminate the reproduction of the musical piece data and instead reproduce the sample data, for example, giving the reproduction of the sample data priority.

At step SP97, the central processing unit 10 inquires of the user whether the user will purchase the musical piece data of the musical piece that the user is currently checking. If the user issues a request to purchase the musical piece data via the operation key 15, the central processing unit 10 proceeds to step SP98. At step SP98, the central processing unit 10 requests, of the musical piece distribution server 6, the purchase of the musical piece data corresponding to the associated musical piece information. As a result, the musical piece distribution server 6 performs a purchase process for the musical piece data and transmits the musical piece data. The central processing unit 10 receives the musical piece data, and proceeds to step SP99. At step SP99, the central processing unit 10 records the received musical piece data on the hard disk drive 13 and associates the associated musical piece information with the musical piece data. In addition, the central processing unit 10 deletes the musical piece data that has been reproduced (i.e., the musical piece data extracted from the program audio data D1), and proceeds to step SP100. At step SP100, the central processing unit 10 moves the reference position in the playlist forward to the next item in accordance with the order of reproduction, and returns to step SP92.

If at the above-described step SP94, the user issues a request to reproduce the next musical piece data via the operation key 15 as the user does not appreciate the current musical piece, the central processing unit 10 proceeds to step SP100. If at the above-described step SP97, the user issues the request to reproduce the next musical piece data via the operation key 15 as the user decides not to purchase the current musical piece data, the central processing unit 10 proceeds to step SP100.

Thereafter, the central processing unit 10 repeats the processes of steps SP92 to SP100 cyclically until the determination at step SP92 becomes negative. Thus, while reproducing the pieces of musical piece data sequentially in accordance with the playlist, the central processing unit 10 purchases the musical piece data, if so requested by the user, and records the purchased musical piece data in place of the corresponding musical piece data extracted from the program audio data D1.

If the determination at the above-described step SP92 is negative, which means that the reproduction of all pieces of musical piece data has been completed according to the playlist or that the user has issued a request to forcibly terminate the reproduction thereof, the central processing unit 10 proceeds to step SP101, thereby finishing the musical piece purchase procedure RT6.

According to the present embodiment, when recording the radio program broadcast by the radio station 3, the central processing unit 10 of the data recording apparatus 2 detects, while recording the program audio data D1 of the radio program onto the hard disk drive 13, the musical piece likeliness of the pieces of processing-unit data of the program audio data D1 sequentially. Based on the result of the detection of the musical piece likeliness, the central processing unit 10 identifies the musical piece candidate sections MC1 to MCm within the program audio data D1. Further, based on the musical piece candidate sections MC1 to MCm and either the pieces of broadcast musical piece information OAM1 to OAMn contained in the broadcast musical piece table OAT acquired from the external radio broadcast information distribution server 4 or the pieces of presentation-use musical piece information acquired from the external musical piece information search server 5, the central processing unit 10 determines the musical piece sections within the program audio data D1. Then, the central processing unit 10 extracts from the program audio data D1 the musical piece sections as the musical piece data, and records the pieces of associated musical piece information on the hard disk drive 13 so as to be associated with the corresponding pieces of musical piece data.

That is, the data recording apparatus 2 does not simply determine the musical piece sections within the program audio data D1 of the radio program using the broadcast musical piece table OAT. Instead, the data recording apparatus 2 identifies the musical piece candidate sections MC1 to MCm within the program audio data D1 and then, based on the musical piece candidate sections MC1 to MCm and either the pieces of broadcast musical piece information OAM1 to OAMn or the pieces of presentation-use musical piece information, determines the musical piece sections within the program audio data D1. Therefore, the data recording apparatus 2 is capable of determining the musical piece sections within the program audio data D1 such that the determined musical piece sections do not include audio data of a musical piece introduction, a commercial message, or the like that may be broadcast near the top or rear end of the musical piece data.

According to the present embodiment, while the program audio data D1 is recorded on the hard disk drive 13, the musical piece likeliness is detected with respect to each of the pieces of processing-unit data that constitute the program audio data D1 and, based on the result of the detection of the musical piece likeliness, the musical piece candidate sections MC1 to MCm are identified within the program audio data D1 and, based on the musical piece candidate sections MC1 to MCm and either the pieces of broadcast musical piece information OAM1 to OAMn or the pieces of presentation-use musical piece information, the musical piece sections are determined within the program audio data D1, and the pieces of associated musical piece information are recorded onto the hard disk drive 13 so as to be associated with the corresponding musical piece sections. Accordingly, the data recording apparatus 2 is capable of determining the musical piece sections within the program audio data D1 such that the determined musical piece sections do not include a superfluity such as the audio data of the musical piece introduction, the commercial message, or the like that may be broadcast near the top or rear end of the musical piece data. Therefore, the data recording apparatus 2 achieves an improvement in the precision with which the musical piece data is extracted from the program audio data D1.

When determining the musical piece sections, the data recording apparatus 2 can use the pieces of broadcast musical piece information OAM1 to OAMn within the broadcast musical piece table OAT delivered from the radio broadcast information distribution server 4. Therefore, the data recording apparatus 2 is able to accurately determine only the sections that correspond to the musical piece data of the musical pieces broadcast in the radio program to be the musical piece sections within the program audio data D1. In addition, when determining the musical piece sections, the data recording apparatus 2 can generate the apparatus-presented musical piece fingerprint information with respect to the musical piece candidate section data of each of the musical piece candidate sections MC1 to MCm identified within the program audio data D1, and use the presentation-use musical piece information presented from the musical piece information search server 5 in response to the presentation of the apparatus-presented musical piece fingerprint information. Therefore, the data recording apparatus 2 is able to determine not only the musical piece data of the musical pieces broadcast in the radio program but also the section of the theme tune TM of the radio program and the like to be the musical piece sections within the program audio data D1. Therefore, when reproducing the musical piece data extracted from the program audio data D1, the data recording apparatus 2 is able to allow the user to listen to not only the musical pieces broadcast in the radio program but also the theme tune TM of the radio program and the like.

Further, if, when the data recording apparatus 2 reproduces a piece of musical piece data extracted from the program audio data D1 for the user to listen to the corresponding musical piece, the user issues the request to purchase the data of the musical piece, the data recording apparatus 2 accesses the musical piece distribution server 6 in response to the request. Thus, in the case where the musical piece based on the musical piece data extracted from the program audio data D1 is incomplete or the sound quality of the musical piece data is deteriorated, the data recording apparatus 2 enables the user to purchase the data of the complete musical piece with undeteriorated sound quality. In the case where the user has purchased the data of the complete musical piece, the data recording apparatus 2 can delete the original musical piece data extracted from the program audio data D1 from the hard disk drive 13 to prevent the free space of the hard disk drive 13 from being wasted.

3. Other Embodiments

The above-described embodiment has been described with reference to an exemplary case where the central processing unit 10 cuts out and thus extracts the musical piece sections from the program audio data D1. However, the present invention is not limited to this example. Alternatively, the central processing unit 10 may make a change in management information called a file allocation table (FAT) within the hard disk drive 13 so that only the musical piece sections of the program audio data D1 will be reproducible, thereby extracting the musical piece sections from the program audio data D1.

Further, the above-described embodiment has been described with reference to an exemplary case where, when the user has purchased the musical piece data extracted from the program audio data D1 from the musical piece distribution server 6, the original musical piece data is deleted. However, the present invention is not limited to this example. Alternatively, the central processing unit 10 may make a change in the management information called the file allocation table (FAT) within the hard disk drive 13 so that the musical piece data extracted from the program audio data D1 will simply become irreproducible.

Still further, the above-described embodiment has been described with reference to an exemplary case where, when determining the musical piece sections within the program audio data D1, the broadcast musical piece table OAT called "on-air-list information" is employed. However, the present invention is not limited to this example. Alternatively, while the reordering of the program audio data D1 and the identification of the musical piece candidate sections MC1 to MCm are performed concurrently during the broadcast of the radio program, the musical piece section may be determined within the program audio data D1 using musical piece information (i.e., now-on-air information) of a musical piece that is currently being broadcast. The now-on-air information is provided each time a musical piece is broadcast in the radio program.

Still further, the above-described embodiment has been described with reference to an exemplary case where the detection of the musical piece likeliness is performed concurrently with the recording of the program audio data D1. However, the present invention is not limited to this example. Alternatively, it may be so arranged that after the program audio data D1 has once been recorded on the hard disk drive 13, the program audio data D1 is read from the hard disk drive 13 in response to a user request, for example, for the detection of the musical piece likeliness. This also produces similar effects to those of the above-described embodiment.

Still further, the above-described embodiment has been described with reference to an exemplary case where the musical piece discrimination information and the time information are recorded in the musical piece discrimination procedure RT3. However, the present invention is not limited to this example. Alternatively, in the musical piece discrimination procedure RT3, the musical piece discrimination information may be added as a pointer to the program audio data D1. In this case, the musical piece candidate sections MC1 to MCm can be identified by scanning the program audio data D1 without the need to record the musical piece discrimination information and the time information in the musical piece discrimination procedure RT3.

Still further, the above-described embodiment has been described with reference to an exemplary case where the musical piece candidate sections MC1 to MCm are identified, being measured in seconds, within the program audio data D1. However, the present invention is not limited to this example. The musical piece candidate sections MC1 to MCm may be measured in any unit as long as that unit is more minute than the unit of measure for the broadcast date/time information OTI1. For example, the musical piece candidate sections MC1 to MCm may be identified, being measured in milliseconds, within the program audio data D1 while the musical piece likeliness is detected with respect to pieces of processing-unit data of a smaller size. In this case, as compared to the above-described embodiment, the precision with which the musical piece is extracted from the broadcast information is further improved.

Still further, the above-described embodiment has been described with reference to an exemplary case where the musical piece data is extracted from the program audio data D1 of the radio program. However, the present invention is not limited to this example. Alternatively, the musical piece data may be extracted from audio data of an analog or digital television broadcasting program, an Internet protocol television (IPTV) broadcast, an Internet radio broadcast, or the like. The audio data is not limited to the broadcast information, but may be any audio data as long as music and a voice (a talk) coexist therein.

Still further, the above-described embodiment has been described with reference to an exemplary case where the musical piece likeliness is detected with respect to the entire program audio data D1. However, the present invention is not limited to this example. For example, the aforementioned related art technique of Japanese Patent Laid-Open No. 2005-332475 may be employed in conjunction with an embodiment of the present invention. Specifically, when program audio data corresponding to a musical piece is recorded on the hard disk drive 13 in accordance with the reception of the now-on-air information according to the aforementioned related art technique of Japanese Patent Laid-Open No. 2005-332475, the detection of the musical piece likeliness may be performed with respect to only the top and rear end portion of the recorded program audio data. In this case, a processing load on the musical piece likeliness detector 37 can be reduced considerably.

Still further, the above-described embodiment has been described with reference to an exemplary case where the data recording apparatus according to one embodiment of the present invention is applied to the musical piece extraction apparatus 100 and the data recording apparatus 2 described above with reference to FIGS. 1 to 17. However, the present invention is not limited to this example. The present invention is widely applicable to various types of musical piece extraction apparatuses, such as a computer or mobile phone that is capable of receiving a radio program or a television program, an information processing apparatus such as a personal digital assistance (PDA), or a recording/reproducing apparatus such as a digital versatile disc (DVD) recorder, an HD DVD recorder, a Blu-ray disc recorder, or a hard disk recorder.

Still further, the above-described embodiment has been described with reference to an exemplary case where a musical piece extraction program according to one embodiment of the present invention is applied to the musical piece extraction program described above with reference to FIGS. 1 to 17 and the central processing unit 10 performs the above-described musical piece discrimination procedure RT3 (FIG. 8), the above-described musical piece extraction procedures RT4 and RT5 (FIGS. 13, 14, and 16), and the above-described musical piece purchase procedure RT6 (FIG. 17) in accordance with the musical piece extraction program. However, the present invention is not limited to this example but widely applicable to various other types of musical piece extraction programs. A program storage medium having stored therein such a musical piece extraction program may be installed into the data recording apparatus 2 to perform the musical piece discrimination procedure RT3, the musical piece extraction procedures RT4 and RT5, and the musical piece purchase procedure RT6. The musical piece extraction program may be configured, for example, to cause the central processing unit 10 to carry out the above-described musical piece likeliness detection process performed by the musical piece likeliness detector 37 and the musical piece fingerprint generation process performed by the musical piece fingerprint generator 38 as a part of the musical piece determination process or the musical piece extraction process.

Still further, the above-described embodiment has been described with reference to an exemplary case where as a recording medium for recording the broadcast information, the recording medium 102 of the musical piece extraction apparatus 100 or the hard disk drive 13 of the data recording apparatus 2 as described above with reference to FIGS. 1 to 17 is used. However, the present invention is not limited to this example. Various other types of recording media can also be used as the recording medium for recording the broadcast information, such as a semiconductor memory, a magnetic memory, an optical memory, an optical disk, a magneto-optical disk, and a magnetic disk which can be removably attached to the data recording apparatus 2, and a semiconductor memory, a magnetic memory, an optical memory, an optical disk, a magneto-optical disk, and a magnetic disk which are contained in the data recording apparatus 2.

Still further, the above-described embodiment has been described with reference to an exemplary case where the broadcast information recorded on the recording medium is the program audio data D1 of the radio program as described above with reference to FIGS. 1 to 17. However, the present invention is not limited to this example. As the broadcast information recorded on the recording medium, various other types of broadcast information are possible, such as program audio data of a television program.

Still further, the above-described embodiment has been described with reference to an exemplary case where as a broadcast information recording section configured to record the broadcast information onto the recording medium, the broadcast information recording section 101 of the musical piece extraction apparatus 100 or the central processing unit 10 of the data recording apparatus 2 as described above with reference to FIGS. 1 to 17 is used. However, the present invention is not limited to this example. Various other types of broadcast information recording sections are possible, such as a broadcast information recording circuit (i.e., a hardware component) for recording the broadcast information onto the recording medium.

Still further, the above-described embodiment has been described with reference to an exemplary case where as a musical piece candidate section identification section configured to, based on a result of detection of the musical piece likeliness by a musical piece likeliness detection section, identify a musical piece candidate section within the broadcast information recorded on the recording medium, the musical piece candidate section identification section 104 of the musical piece extraction apparatus 100 or the central processing unit 10 of the data recording apparatus 2 as described above with reference to FIGS. 1 to 17 is used. However, the present invention is not limited to this example. Various other types of musical piece candidate section identification sections are possible, such as a musical piece candidate section identification circuit (i.e., a hardware component) for identifying, based on the result of the detection of the musical piece likeliness by the musical piece likeliness detection section, the musical piece candidate section within the broadcast information recorded on the recording medium.

Still further, the above-described embodiment has been described with reference to an exemplary case where the external server 106, the radio broadcast information distribution server 4, and the musical piece information search server 5 as described above with reference to FIGS. 1 to 17 function as external servers. However, the present invention is not limited to this example. Various other types of servers, such as a television broadcast information distribution server, can also function as the external server.

Still further, the above-described embodiment has been described with reference to an exemplary case where as a musical piece information acquisition section configured to acquire the musical piece information from the external server, the musical piece information acquisition section 105 of the musical piece extraction apparatus 100 or the central processing unit 10 and the communication processing section 16 of the data recording apparatus 2 as described above with reference to FIGS. 1 to 17 is used. However, the present invention is not limited to this example. Various other types of musical piece information acquisition sections are possible, such as a musical piece information acquisition circuit (i.e., a hardware component) for acquiring the musical piece information from the external server.

Still further, the above-described embodiment has been described with reference to an exemplary case where as a musical piece section determination section configured to, based on the musical piece candidate section identified by the musical piece candidate section identification section and the musical piece information acquired by the musical piece information acquisition section, determine the musical piece section within the broadcast information recorded on the recording medium, the musical piece section determination section 107 of the musical piece extraction apparatus 100 or the central processing unit 10 of the data recording apparatus 2 as described above with reference to FIGS. 1 to 17 is used. However, the present invention is not limited to this example. Various other types of musical piece section determination sections are possible, such as a musical piece section determination circuit (i.e., a hardware component) for determining, based on the musical piece candidate section identified by the musical piece candidate section identification section and the musical piece information acquired by the musical piece information acquisition section, the musical piece section within the broadcast information recorded on the recording medium.

Still further, the above-described embodiment has been described with reference to an exemplary case where as a musical piece information recording section configured to record the musical piece information onto the recording medium so as to be associated with the musical piece section, the musical piece information recording section 108 of the musical piece extraction apparatus 100 or the central processing unit 10 of the data recording apparatus 2 as described above with reference to FIGS. 1 to 17 is used. However, the present invention is not limited to this example. Various other types of musical piece information recording sections are possible, such as a musical piece information recording circuit (i.e., a hardware component) for recording the musical piece information onto the recording medium so as to be associated with the musical piece section.

The present invention may find application in musical piece extraction apparatuses, such as a personal computer, a mobile phone, a music player, etc., capable of receiving and recording a radio or television broadcast.

It should be understood by those skilled in the art that various modifications, combinations, sub-combinations and alterations may occur depending on design requirements and other factors insofar as they are within the scope of the appended claims or the equivalents thereof.

What is claimed is:

1. A computer program product having musical piece extraction program stored in a computer-readable storage medium, the program causing a computer to perform a process comprising the steps of:

identifying a musical piece candidate time information of a musical piece candidate data within the audio data;

determining a musical piece time information of the musical piece data within the audio data, based on the identified musical piece candidate time information of the musical piece candidate data and a musical piece information acquired from an external server; and storing the musical piece information in a storage medium so as to be associated with the musical piece time information of musical piece data.

2. The computer program product according to claim 1, causing the computer to perform said process, the process further comprising the step of:

acquiring the musical piece information from the external server, the musical piece information containing a musical piece title corresponding to the audio data and a broadcast date/time information corresponding to the musical piece title; and said determining step determines the musical piece time information of the musical piece data within the audio data, based on the musical piece candidate time information of the musical piece candidate data and the broadcast date/time information contained in the musical piece information.

3. The computer program product according to claim 1, causing the computer to perform said process, the process further comprising the steps of:

generating identification information for a plurality of partial audio data based on at least a part of the partial audio data, with respect to each musical piece candidate time information of the musical piece candidate data, the partial audio data being a part of the audio data that corresponds to the musical piece candidate time information of the musical piece candidate data; and transmitting the generated identification information to the external server;

acquiring the musical piece information from the external server, the musical piece information being transmitted from the external server in accordance with the identification information and containing a musical piece title; and said determining step determines the musical piece time information of the musical piece data within the audio data based on the musical piece candidate time information of the musical piece candidate data and the musical piece title contained in the musical piece information, while musical piece candidate time information of the musical piece candidate data corresponding to an identical musical piece title are integrated into one musical piece time information of musical piece data.

4. The computer program product according to claim 1, causing the computer to perform said process, the process further comprising the steps of:

reproducing a plurality of partial audio data read from the storage medium, the partial audio data being a part of the audio data that corresponds to the musical piece time information of the musical piece data with which the musical piece information is associated; and requesting, of a musical-piece-providing server, purchase of musical piece data corresponding to the musical piece information with which the musical piece time information of the musical piece data is associated, if an instruction to purchase musical piece data is issued.

5. The computer program product according to claim 4, causing the computer to perform said process, the process comprising the step of:

causing the partial audio data corresponding to the musical piece time information of the musical piece data, with which the musical piece information of the musical piece data is associated, to be irreproducible out of the recording medium upon completion of a download of the musical piece data from the musical piece providing server.

6. The computer program product according to claim 5, causing the computer to perform said process, the process further comprising the step of:
- deleting the partial audio data corresponding to the musical piece time information of musical piece data from the storage medium upon completion of the download of the musical piece data from the musical piece providing server.

7. A musical piece extraction apparatus, comprising:
- an identifier section configured to identify a musical piece candidate time information of a musical piece candidate data within an audio data;
- an acquisition section configured to acquire a musical piece information from an external server;
- a determination section configured to, based on the identified musical piece candidate time information of the musical piece candidate data and the acquired musical piece information, determine a musical piece time information of the musical piece data within the audio data; and
- a musical piece information storing section configured to store the musical piece information onto a storage medium so as to be associated with the musical piece time information of musical piece data.

8. A computer implemented musical piece extraction method, comprising the steps of:
- identifying a musical piece candidate time information of a musical piece candidate data within an audio data;
- determining a musical piece time information of the musical piece data within the audio data, based on the identified musical piece candidate time information of the musical piece candidate data and musical piece information acquired from an external server; and
- storing the musical piece information into a storage medium so as to be associated with the musical piece time information of the musical piece data.

* * * * *